(12) United States Patent
Olgiati et al.

(10) Patent No.: US 7,383,424 B1
(45) Date of Patent: Jun. 3, 2008

(54) COMPUTER ARCHITECTURE CONTAINING PROCESSOR AND DECOUPLED COPROCESSOR

(75) Inventors: Andrea Olgiati, Newport (GB); Dominic Paul McCarthy, Mountain View, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 851 days.

(21) Appl. No.: 09/762,981

(22) PCT Filed: Jun. 15, 2000

(86) PCT No.: PCT/GB00/02320

§ 371 (c)(1),
(2), (4) Date: May 9, 2001

(87) PCT Pub. No.: WO00/77626

PCT Pub. Date: Dec. 21, 2000

(51) Int. Cl.
*G06F 15/00* (2006.01)

(52) U.S. Cl. .................. 712/34; 712/15; 712/228; 711/147; 710/5

(58) Field of Classification Search ............. 712/34, 712/15, 35, 228; 711/147–153; 710/15
See application file for complete search history.

(56) References Cited

U.S. PATENT DOCUMENTS

| | | |
|---|---|---|
| 4,099,236 A | 7/1978 | Goodman et al. |
| 4,589,067 A | 5/1986 | Porter et al. |
| 5,121,498 A | 6/1992 | Gilbert et al. ............ 395/700 |
| 5,537,620 A | 7/1996 | Breternitz, Jr. .......... 395/700 |

(Continued)

FOREIGN PATENT DOCUMENTS

EP  0 021 365 A2  1/1981

(Continued)

OTHER PUBLICATIONS

Hennessy, John L., et al., Computer Architecture A Quantative Approach, Second Edition, 1996, Morgan Kaufman Publishers, Inc., pp. 242-251.*

(Continued)

*Primary Examiner*—Tonia L. M. Dollinger
(74) *Attorney, Agent, or Firm*—Ladas & Parry, LLP

(57) ABSTRACT

A computer system comprises a first processor 1 and a second processor 2 for use as a coprocessor to the first processor 1. The system has a main memory 3. The system also has a decoupling element 8 such that instructions are passed to the second processor 2 from the first processor 1 through the decoupling element 8. This has the effects that the second processor 2 consumes instructions derived from the first processor 1 through the decoupling element 8, and that the second processor 2 receives data from and writes data to the memory 3. The processing of instructions by the second processor 2 can thus be decoupled from the operation of the first processor 1.

This is particularly effective for processing of a computationally intensive task (such as a media computation) on an architecture with a general purpose first processor 1, using a second processor 2 adapted for the computationally intensive task. This can effectively be combined with use of a buffer memory 5 adapted to exchange data particularly rapidly with the memory 3 in response to memory instructions, together with a further decoupling element 6 to decouple the buffer memory 5 from the first processor 1.

15 Claims, 12 Drawing Sheets

U.S. PATENT DOCUMENTS

| | | | |
|---|---|---|---|
| 5,590,307 A | 12/1996 | McClure | 395/458 |
| 5,603,007 A | 2/1997 | Yazdy et al. | 395/467 |
| 5,627,994 A | 5/1997 | Levy et al. | 395/477 |
| 5,708,830 A | 1/1998 | Stein | |
| 5,784,582 A | 7/1998 | Hughes | 395/297 |
| 5,860,027 A | 1/1999 | Leyrer et al. | 395/886 |
| 5,862,385 A | 1/1999 | Iitsuka | 395/709 |
| 5,884,050 A | 3/1999 | Wheeler et al. | |
| 6,006,289 A | 12/1999 | James et al. | 710/35 |
| 6,009,493 A | 12/1999 | Fujiyama | 711/1 |
| 6,049,839 A | 4/2000 | Fujii et al. | 710/1 |
| 6,052,713 A * | 4/2000 | Kim | 709/213 |
| 6,061,749 A * | 5/2000 | Webb et al. | 710/65 |
| 6,085,261 A | 7/2000 | McIntyre, Jr. et al. | 710/35 |
| 6,209,071 B1 | 3/2001 | Barth et al. | 711/167 |
| 6,237,079 B1 * | 5/2001 | Stoney | 712/34 |

FOREIGN PATENT DOCUMENTS

| | | |
|---|---|---|
| EP | 0 447 145 A2 | 9/1991 |
| EP | 0 549 924 | 7/1993 |
| EP | 0 581 698 A1 | 2/1994 |
| EP | 0 853 283 A1 | 7/1998 |
| EP | 0 862 118 | 9/1998 |
| EP | 0 924 625 | 6/1999 |
| GB | 2 250 615 A | 6/1992 |
| JP | 2-250137 | 10/1990 |
| JP | 2-250138 | 10/1990 |
| WO | 91/11767 | 8/1991 |
| WO | 98/33276 | 7/1998 |
| WO | 98/33277 | 7/1998 |

OTHER PUBLICATIONS

Messias et al., "Team an array processor with a μP for super performance in data comm," *Electronic Design 8*, XP-000211543, pp. 115-120 (Apr. 12, 1980).

Bellows, P. and B. Hutchings, "JHDL—An HDL for Reconfigurable Systems," *Proceedings of the IEEE Symposium on Field-Programmable Custom Computing Machines*, 10 pages (Apr. 1998).

Dijkstra, E., "Co-operating Sequential Processes," *Programming Languages*, F. Genuys (ed.), pp. 43-112 (1968).

Handy, J., *The Cache Memory Book*, Academic Press, pp. 9 and 12-22 (1993).

Hennessy, J. and D. Patterson, *Computer Architecture: A Quantitative Approach*, Morgan Kaufman Publishers, Inc., pp. 414-416, 444-445, and 475-478 (1990).

Pugh, W. and D. Wonnacott, "An Exact Method for Analysis of Value-based Array Data Dependences," *Languages and Compilers for Parallel Computing*, Springer-Verlag, pp. 546-566 (1993).

\* cited by examiner

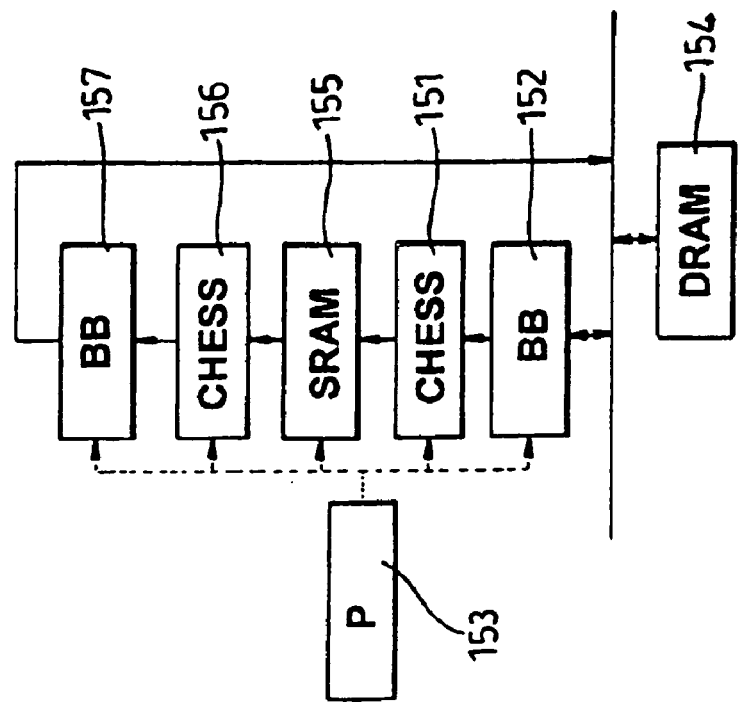
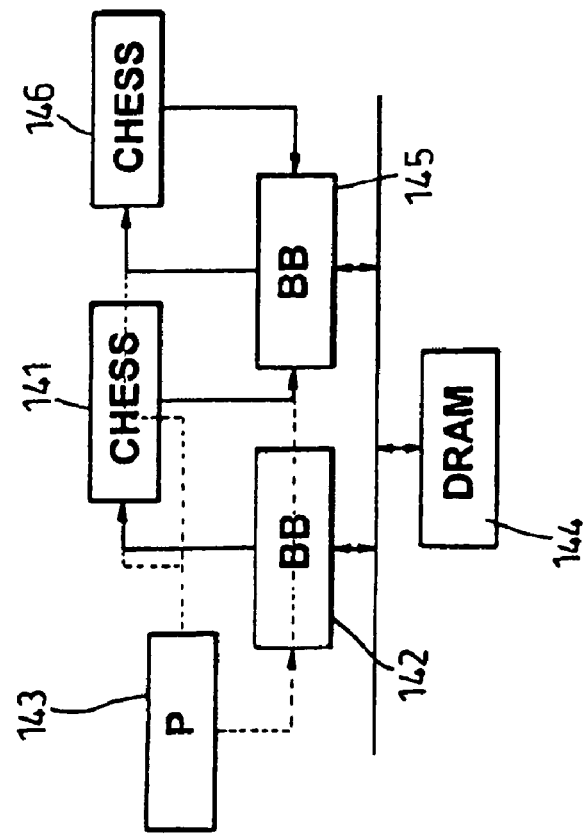
*Fig. 11B*
*Fig. 11A*

COMPUTER ARCHITECTURE CONTAINING PROCESSOR AND DECOUPLED COPROCESSOR

FIELD OF INVENTION

The invention relates to computer architectures involving a main processor and a coprocessor.

DESCRIPTION OF PRIOR ART

Microprocessor-based computer systems are typically based around a general purpose microprocessor as CPU. Such microprocessors are well adapted to handle a wide range of computational tasks, but they are inevitably not optimised for all tasks. Where tasks are computationally intense (such as media processing) then the CPU will frequently not be able to perform acceptably.

One of the possible approaches to this problem is to use coprocessors specifically adapted to handle individual computationally difficult tasks. Such coprocessors are termed ASICs (Application Specific Integrated Circuits). These are built for specific computational tasks, and can thus be optimised for such tasks. They are however inflexible both in use and in programming (as they are designed for a specific task alone) and are typically slow to produce. Improved solutions can be found by construction of flexible hardware which can be programmed with a configuration particularly suited to a given computational task, such as FPGAs (Field Programmable Gate Arrays). Further flexibility is achieved if such structures are not only configurable, but reconfigurable. An example of such a reconfigurable structure is the CHESS array, discussed in International Patent Application No. GB98/00262, International Patent Application No. GB98/00248, U.S. patent application Ser. No. 09/209,542, filed on 11 Dec. 1998, and its European equivalent European Patent Application No. 98309600.9.

Although use of such coprocessors can considerably improve the efficiency of such computation, the limitations of the microprocessor acting as CPU can still have a very significant effect on overall system performance where such computations are required. It would be desirable to improve a processor-coprocessor system still further such that the limitations of the processor have a lesser effect on overall performance.

SUMMARY OF INVENTION

Accordingly, there is provided computer system, comprising: a first processor; a second processor for use as a coprocessor to the first processor; a memory; and a decoupling element; wherein instructions are passed to the second processor from the first processor through the decoupling element, such that the second processor consumes instructions derived from the first processor through the decoupling element, and wherein the second processor receives data from and writes data to the memory, whereby the processing of instructions by the second processor is decoupled from the operation of the first processor.

This arrangement can produce considerable improvements in performance, as the first processor, typically a general purpose microprocessor, can switch tasks while execution of the instructions is carried out on the second processor, typically a processor specially adapted to carry out the computation or type of computation delegated to it. This is very important when the first processor is the central processing unit of a computer device, and thus may be required for a number of other tasks. It is a particularly effective arrangement when the second processor is configurable or reconfigurable.

The only task relating to the computation that may be left to the first processor is servicing of the decoupling element (so that it can provide instructions effectively). Advantageously, the decoupling element may be set up so that it will require no such servicing during performance of the delegated task.

One possible choice of decoupling element is a coprocessor instruction queue, wherein instructions are added to the coprocessor instruction queue by the first processor and consumed from the coprocessor instruction queue by the coprocessor. An alternative choice is a state machine, wherein information to provide instructions is provided to the state machine by the first processor, and instructions are provided in an ordered sequence to the second processor by the state machine. A further alternative choice is a third processor, wherein information to provide instructions to the second processor is provided to the third processor by the first processor, and instructions are provided in an ordered sequence to the second processor by the third processor.

An effective arrangement is for the system to include a coprocessor controller for controlling the activity of the second processor and for synchronising the execution of the coprocessor with loads from memory.

The system is particularly effective if it also includes a buffer memory from which the second processor loads data and to which the second processor stores data, wherein the buffer memory is adapted to load data from the memory and store data to the memory. This has significant performance benefits for media algorithms in particular if the memory is dynamic random access memory, and the buffer memory is adapted to load data from, or store data to, the buffer memory in bursts.

Decoupling of the first processor from the buffer memory can be achieved by use of a second decoupling element, wherein memory instructions relating to movement of data between the buffer memory and the memory are passed to the buffer memory from the first processor through this second decoupling element, such that the buffer memory consumes instructions derived from the first processor through the second decoupling element. The processing of memory instructions by the buffer memory is thus decoupled from the operation of the first processor.

Where such a buffer memory is used, and as the first processor is decoupled from the other system elements, it is desirable for there to be a synchronisation mechanism to synchronise transfer of data between the buffer memory and the memory with execution of instructions by the second processor. Preferably, this is adapted to block execution of instructions by the second processor on data which has not yet been loaded to the buffer memory from the memory, and is adapted to block execution memory instructions for storage of data from the buffer memory to the memory where relevant instructions have not yet been executed by the second processor. Greatest efficiency is achieved when if execution of instructions or memory instructions is blocked by the synchronisation mechanism, other instructions or memory instructions which are not blocked by the synchronisation mechanism may still be carried out.

In a further aspect, the invention provides a method of operating a computer system, comprising: providing code for execution by a first processor; extraction from the code of a task to be carried out by a second processor acting as coprocessor to the first processor; passing information defining the task from the first processor to a decoupling element;

passing instructions derived from said information from the decoupling element to the second processor and executing said instructions on the second processor, wherein the processing of said instructions by the second processor is decoupled from the operation of the first processor.

BRIEF DESCRIPTION OF FIGURES

Specific embodiments of the invention will be described further below, by way of example, with reference to the accompanying drawings, in which:

FIGS. 11A and 11B show alternative pipeline architectures employing further embodiments of the present invention;

DESCRIPTION OF SPECIFIC EMBODIMENTS

Figure 1:
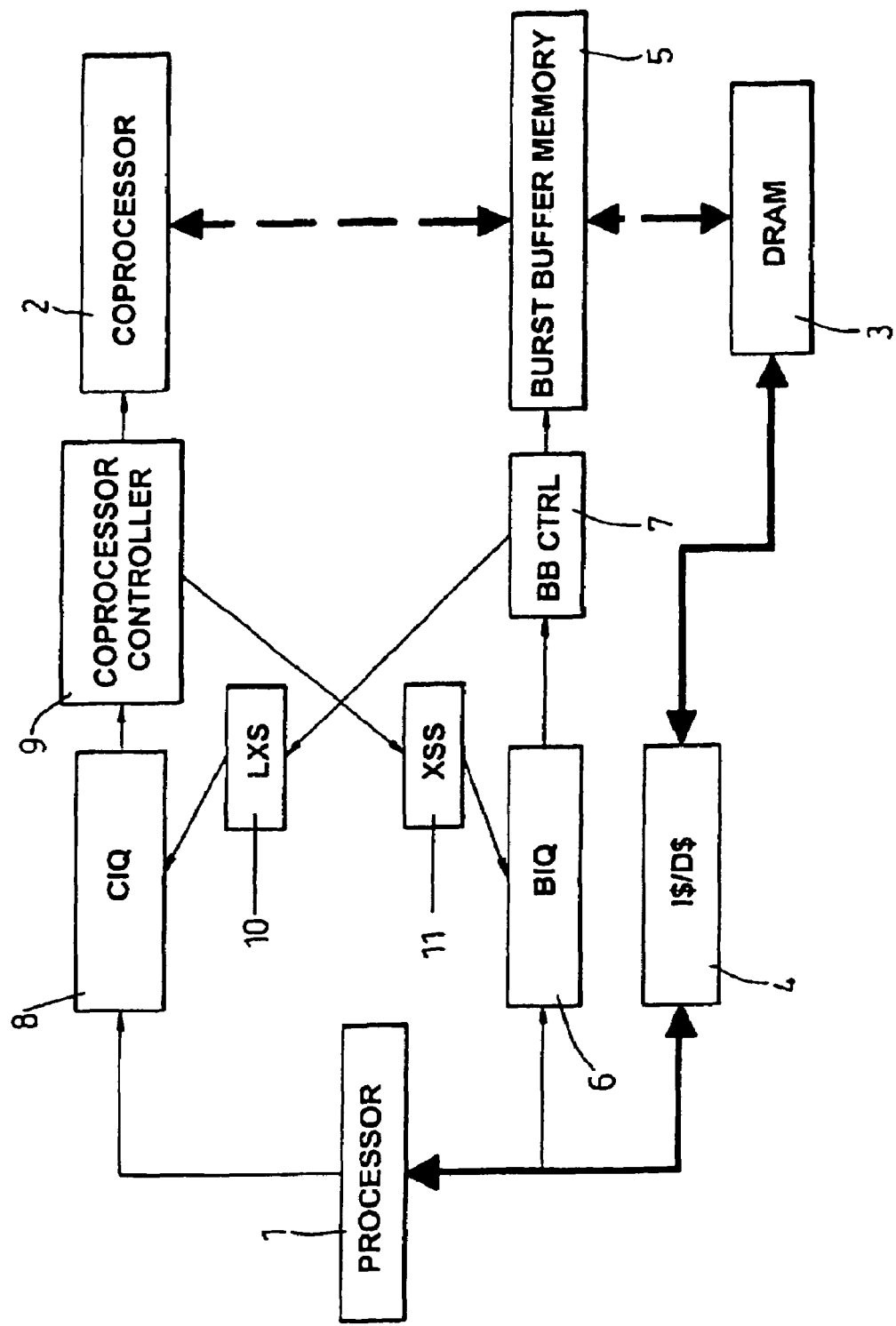
FIG. 1 shows the basic elements of a system in accordance with a first embodiment of the invention.

FIG. 1 shows the basic elements of a system in accordance with a first embodiment of the invention. Essentially, the system comprises a processor 1 and a coprocessor 2, established so that a calculation can be partitioned between the processor 1 and the coprocessor 2 for greatest computational efficiency. The processor 1 may be essentially any general purpose processor (for example, an i960) and the coprocessor 2 essentially any coprocessor capable of handling with significantly greater effectiveness a part of the calculation. In the specific system described here, essentially the whole computation is to be handled by the coprocessor 2, rather than by the processor 1—however, the invention is not limited to this specific arrangement.

In the system specifically described, coprocessor 2 is a form of reconfigurable FPGA, as will be discussed further below—however, other forms of coprocessor 2, such as, for example, ASICS and DSPs, could be employed instead (with corresponding modifications to the computational model required). Both the processor 1 and coprocessor 2 have access to a DRAM main memory 3, though the processor 1 also has access to a cache of faster access memory 4, typically SRAM. Efficient access to the DRAM 3 is provided by "burst buffer" memory 5 adapted to communicate with DRAM for the efficient loading and storing of "bursts" of information—burst buffers will be described further below. Instructions to the burst buffers 5 are provided through a burst instruction queue 6, and the burst buffers 5 operate under the control of a burst buffer controller 7. The architecture of the burst buffers is mirrored, for reasons discussed below, in the architecture associated with the coprocessor 2. Instructions to the coprocessor 2 are provided in a coprocessor instruction queue 8, and the coprocessor operates under the control of a coprocessor controller 9. Synchronisation of the operation of the burst buffers and the coprocessor and their associated instruction queues is achieved by a specific mechanism, rather than in a general manner by processor 1 itself. In this embodiment, the mechanism comprises the load/execute semaphore 10 and the execute/store semaphore 11, operating in a manner which will be described below (other such synchronisation mechanisms are possible, as will also be discussed).

Description of Elements in System Architecture

The individual elements of the system will now be discussed in more detail. The processor 1 generally controls the computation, but in such a manner that some (or, in the embodiment described, all) of the steps in the computation itself are carried out in the coprocessor 2. The processor 1 provides, through the burst instruction queue 6, instructions for particular tasks: configuration of the burst buffer controller 7; and transfer of data between the burst buffer memory 5 and the main memory 3. Furthermore, through the coprocessor instruction queue 8, the processor 1 also provides instructions for further tasks: configuration of the coprocessor controller 9; and initiation of a computation on coprocessor 2. This computation run on coprocessor 2 accesses data through the burst buffer memory 5.

The use of the coprocessor instruction queue 8 effectively decouples the processor 1 from the operation of coprocessor 2, and the use of the burst instruction queue 6 effectively decouples the processor 1 from the burst buffers 5. The specific detail of this arrangement is discussed in greater detail below. This decoupling will be discussed further below in the context of the computational model for this embodiment of the invention.

The coprocessor 2 performs some or all of the actual computation. A particularly suitable coprocessor is the CHESS FPGA structure, described in International Patent Application No. GB98/00262, International Patent Application No. GB98/00248, U.S. patent application Ser. No. 09/209,542, filed on 11 Dec. 1998, and its European equivalent European Patent Application No. 98309600.9, the contents of which applications are incorporated by reference herein to the extent permissible by law. This coprocessor is reconfigurable, and comprises a checkerboard array of 4-bit ALUs and switching structures, whereby the coprocessor is configurable that an output from one 4-bit ALU can be used to instruct another ALU. The CHESS architecture is particularly effective for pipelined calculations, and is effectively adapted here to interact with input and output data streams. The coprocessor controller 9 (whose operation will be discussed further below) receives high-level control instructions (instructions for overall control of the coprocessor 2, rather than instructions relating to detail of the calculation—e.g. "run for n cycles") from the coprocessor instruction queue 8. The CHESS coprocessor 2 runs under the control of the coprocessor controller 9 and receives and stores data through interaction with the burst buffers 5. The CHESS coprocessor 2 thus acts on input streams to produce an output stream. This can be an efficient process because the operation of the CHESS coprocessor is highly predictable. The detailed operation of computation according to this model is discussed at a later point.

The processor 1 has access to a fast access memory cache 4 in SRAM in a conventional manner, but the main memory is provided as DRAM 3. Effective access to the DRAM is provided by burst buffers 5. Burst buffers have been described in European Patent Application No. 97309514.4 and corresponding U.S. patent application Ser. No. 09/3,526, filed on 6 Jan. 1998, which applications are incorporated by reference herein to the extent permissible by law. The burst buffer architecture is described briefly herein, but for full details of this architecture the reader is referred to these earlier applications.

The burst buffer architecture is useful, but not fundamental, to the operation of the present invention as described in these embodiments. In the context of the present invention, the most significant aspect of the burst buffers architecture is that the burst buffers 5 operate according to instructions from the processor 1, and that these instructions are provided by means of a queue (or alternative, as discussed below). This mechanism allows for the possibility of decoupling of the processor 1 from operation of the burst buffers 5 in an appropriate architecture.

Figure 2:
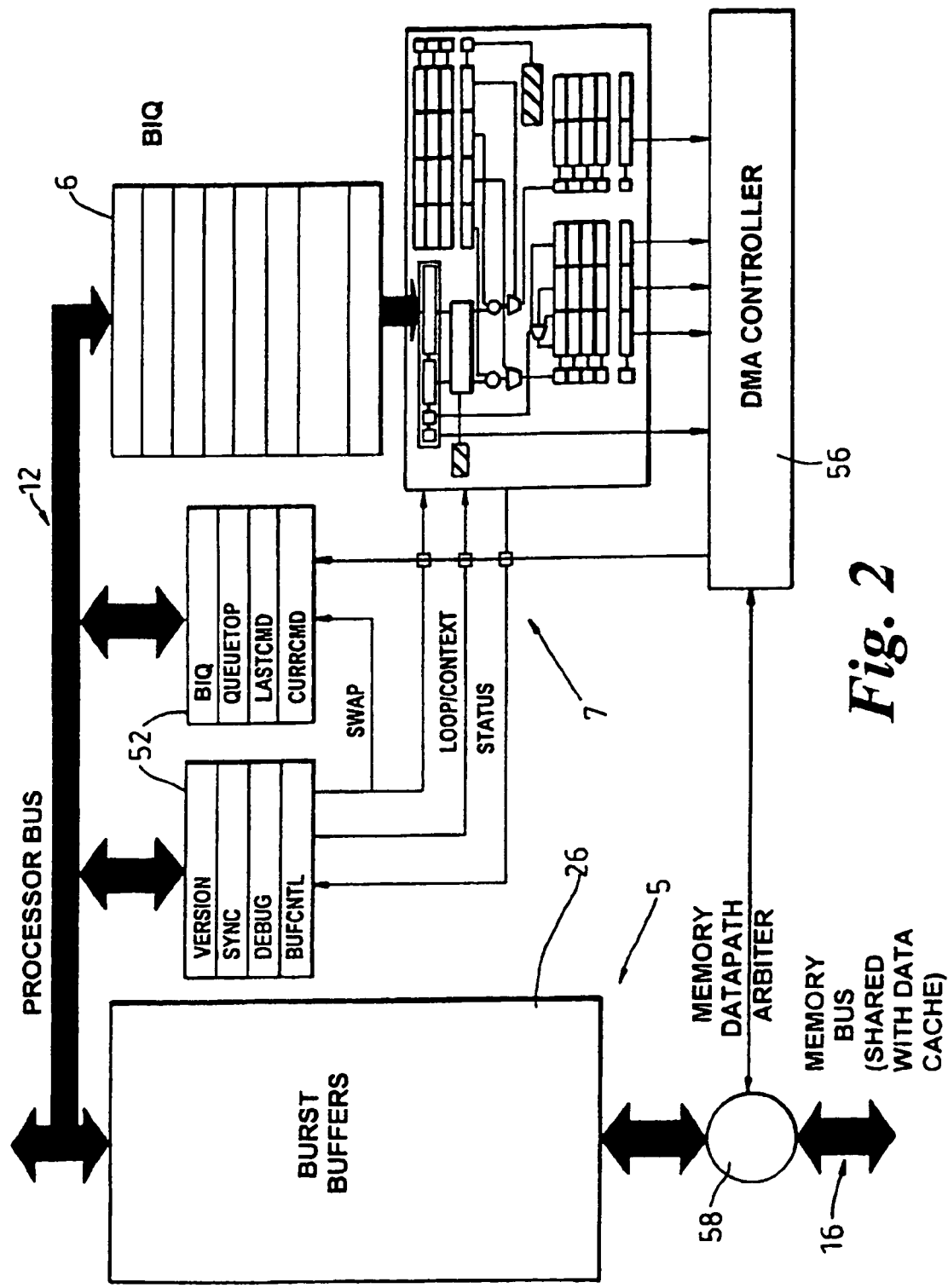
FIG. 2 shows the architecture of a burst buffers structure used in the system of FIG. 1.
Figure 3:
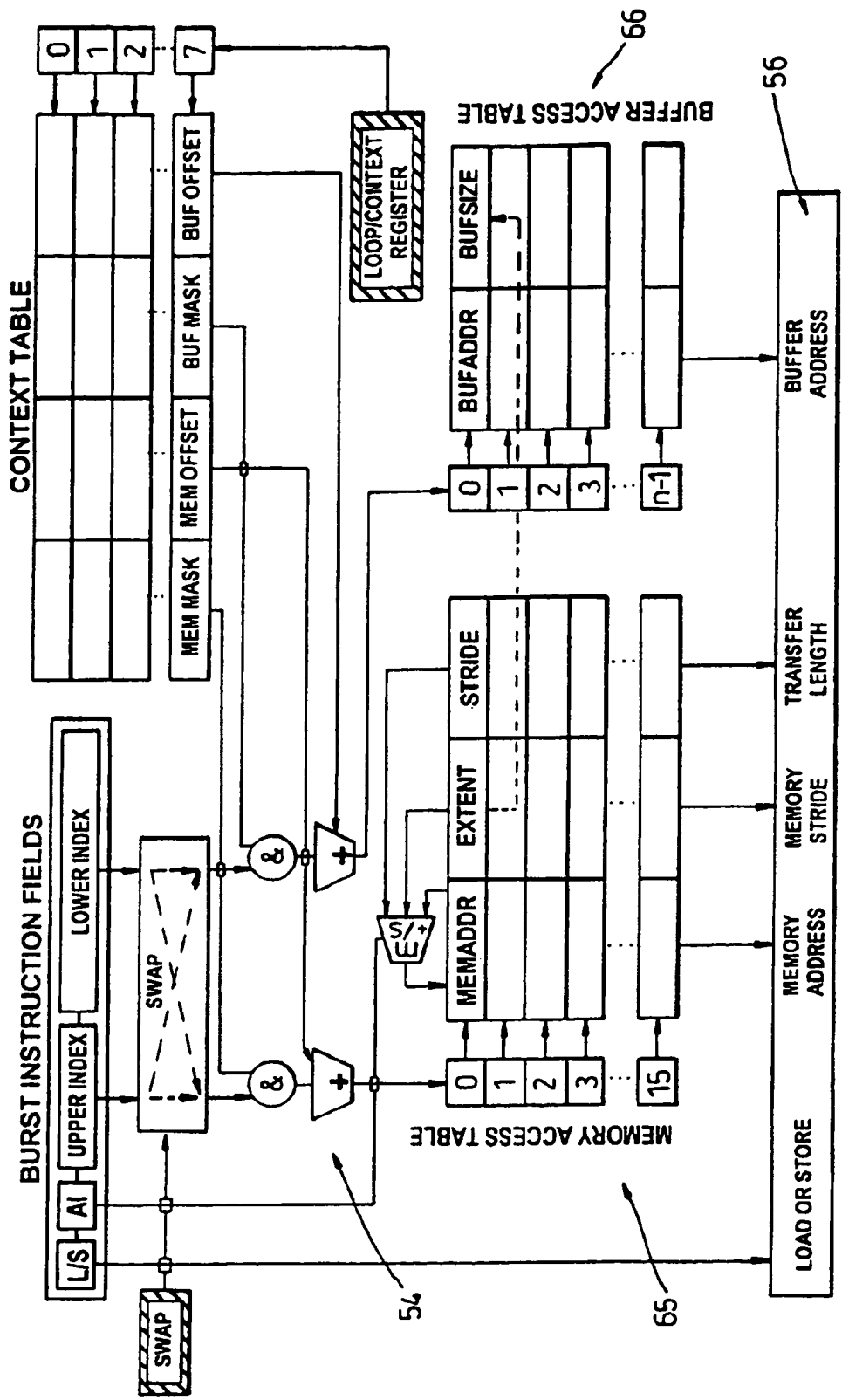
FIG. 3 shows further features of the burst buffers structure of FIG. 2.

The elements of the version of the burst buffers architecture (variants are available, as is discussed in the aforementioned application) used in this embodiment are shown in FIGS. 2 and 3. A connection 12 for allowing the burst buffers components to communicate with the processor 1 is provided. Memory bus 16 provides a connection to the main memory 3 (not shown in FIG. 2). This memory bus may be shared with cache 4, in which case memory datapath arbiter 58 is adapted to allow communication to and from cache 4 also.

The overall role of burst buffers in this arrangement is to allow computations to be performed on coprocessor 2 involving transfer of data between this coprocessor 2 and main memory 3 in a way that both maximises the efficiency of each system component and at the same time maximises the overall system efficiency. This is achieved by a combination of several techniques:
- burst accesses to DRAM, using the burst buffers 5 as described below;
- simultaneous execution of computation on coprocessor 2 and data transfers between main memory 3 and burst buffer memory 5, using a technique called "double buffering"; and
- decoupling the execution of processor 1 from the execution of coprocessor 2 and burst buffer memory 5 through use of the instruction queues.

"Double buffering" is a technique known in, for example, computer graphics. In the form used here it involves consuming—reading—data from one part of the burst buffer memory 5, while producing—writing—other data into a different region of the same memory, with a switching mechanism to allow a region earlier written to now to be read from, and vice-versa.

A particular benefit of burst buffers is effective utilisation of a feature of conventional DRAM construction. A DRAM comprises an array of memory locations in a square matrix. To access an element in the array, a row must first be selected (or 'opened'), followed by selection of the appropriate column. However, once a row has been selected, successive accesses to columns in that row may be performed by just providing the column address. The concept of opening a row and performing a sequence of accesses local to that row is called a "burst". When data is arranged in a regular way, such as in media-intensive computations (typically involving an algorithm employing a regular program loop which accesses long arrays without any data dependent addressing), then effective use of bursts can dramatically increase computational speed. Burst buffers are new memory structures adapted to access data from DRAM through efficient use of bursts.

A system may contain several burst buffers. Typically, each burst buffer is allocated to a respective data stream. Since algorithms have a varying number of data streams, a fixed amount of SRAM 26 is available to the burst buffers as a burst buffer memory area, and this amount is divided up according to the number of buffers required. For example, if the amount of fixed SRAM is 2 Kbytes, and if an algorithm has four data streams, the memory region might be partitioned into four 512 Byte burst buffers.

In architectures of this type, a burst comprises the set of addresses defined by:

$$\text{burst} = \{B + S \times i | B, S, i \in N \wedge 0 \leq i \leq L\}$$

where B is the base address of the transfer, S is the stride between elements, L is the length and N is the set of natural numbers. Although not explicitly defined in this equation, the burst order is defined by i incrementing from 0 to L−1. Thus, a burst may be defined by the 3-tuple of:

(base_address, length, stride)

In software, a burst may also be defined by the element size. This implies that a burst maybe sized in bytes, half-words or words. The units of stride must take this into account. A "sized-burst" is defined by a 4-tuple of the form:

(base_address, length, stride, size)

A "channel-burst" is a sized-burst where the size is the width of the channel to memory. The compiler is responsible for the mapping of software sized-bursts into channel-bursts. The channel-burst may be defined by the 4-tuple:

(base_address, length, stride, width)

If the channel width is 32 bits (or 4 bytes), the channel-burst is always of the form:

(base_address, length, stride, 4)

or abbreviated to the 3-tuple (base_address, length, stride).

The control of this memory and the allocation (and freeing) of burst buffers is handled at a higher level by a software process. In the present embodiment, "double buffering" is used, but other strategies are certainly possible—the decision involves a trade-off between storage efficiency and simplicity. The burst buffer memory area 26 loads data from and stores data to the main memory 3 through memory datapath arbiter 58, which operates under control of DMA controller 56, responsive to instructions received through the burst instruction queue 6. Data is exchanged between the burst buffer memory area 26 and the processor 1 or the coprocessor 2 through the connection means 12. As shown in FIG. 3, the control interface for the burst buffers system 5 is based around a pair of tables: a Memory Access Table (MAT) 65 describing regions of main memory for bursting to and from the burst buffer memory, and a Buffer Access Table (BAT) 66 describing regions of burst buffer memory. In this embodiment, a homogeneous area of dual-port SRAM is used for the burst buffer memory area 26.

A burst buffers arrangement which did not employ MATs and BATs (such as is also described in European Patent Application No. 97309514.4) could be used in alternative embodiments of the present invention—the parameters implicitly encoded in MATs and BATs (source address, destination address, length, stride) would then have to be explicitly specified for every burst transfer issued. The main reason to use MATs and BATs, rather than straightforward addresses, lengths and strides, is that this significantly reduces the overall code size. In the context of the present invention, this is typically useful, rather than critical.

Burst instructions originating from the processor 1 are provided to the burst buffers 5 by means of a burst instruction queue 6. Instructions from the burst instruction queue 6 are processed by a buffer control element 54 to reference slots in the MAT 65 and the BAT 66. The buffer controller also receives control inputs from eight burst control registers 52. Information contained in these two tables is bound together at run time to describe a complete main-memory-to-burst-buffer transaction. Outputs are provided from the buffer controller 54 to direct memory access (DMA) controller 56 and hence to the memory datapath arbiter 58 to effect transactions between the main memory 3 and the burst buffers memory area 26.

The key burst instructions are those used to load data from main memory 3 to the burst buffer memory area 26, and to store data from the burst buffer memory area 26 to the main memory 3. These instructions are "loadburst" and "storeburst". The loadburst instruction causes a burst of data words to be transferred from a determined location in the memory 3 to that one of the burst buffers. There is also a corresponding storeburst instruction, which causes a burst of data words to be transferred from that one of the burst buffers to the memory 3, beginning at a specific address in the memory 3. For the architecture of FIG. 1, additional synchronisation instructions are also required—these are discussed further below.

The instructions loadburst and storeburst differ from normal load and store instructions in that they complete in a single cycle, even though the transfer has not occurred. In essence, the loadburst and storeburst instructions tell the memory interface 16 to perform the burst, but they do not wait for the burst to complete.

The fundamental operation is to issue an instruction which indexes to two table entries, one in each of the memory access and buffer access tables. The index to the memory access table retrieves the base address, extent and stride used at the memory end of the transfer. The index to the buffer access table retrieves the base address within the burst buffer memory region. In the embodiment shown, masking and offsets are provided to the index values by a context table (this is discussed further in European Patent Application No. 97309514.4), although it is possible to use actual addresses instead. The direct memory access (DMA) controller 56 is passed the parameters from the two tables and uses them to specify the required transfer.

Table 1 shows a possible instruction set.

TABLE 1

Instruction set for burst buffers

| Opcode | Parameter Value | Comment |
| --- | --- | --- |
| BB_LOADBURST | mat_index (integer), bat_index (integer), block_increment (boolean) | Load a burst of data into the burst buffer memory from main memory, and optionally increments the base address in main memory |

TABLE 1-continued

Instruction set for burst buffers

| Opcode | Parameter Value | Comment |
| --- | --- | --- |
| BB_STOREBURST | mat_index (integer), bat_index (integer), block_increment (boolean) | Store a burst of data into main memory from the burst buffer memory, and optionally increments the base address in main memory |
| BB_LX_INCREMENT | N/A | Increment the value of the LX semaphore |
| BB_XS_DECREMENT | N/A | Decrement the value of the XS semaphore |
| BB_SET_MAT | entry (integer), memaddr (integer), extent (integer), stride (integer) | Sets a MAT entry to the desired values |
| BB_SET_BAT | entry (integer), bufaddr (integer), extent (integer) | Sets a BAT entry to the desired values |

The storeburst instruction (BB_STOREBURST) indexes parameters in the MAT and BAT, which define the characteristics of the requested transfer. If the block_increment bit is set, the memaddr field of the indexed entry in the MAT is automatically updated when the transfer completes (as is discussed below).

The loadburst instruction (BB_LOADBURST) also indexes parameters in the MAT and BAT, again which define the characteristics of the required transfer. As before, if the block_increment bit is set, the memaddr field of the indexed entry in the MAT is automatically updated when the transfer completes.

The synchronisation instructions needed are provided as Load-Execute Increment and eXecute-Store Decrement (BB_LX_INCREMENT and BB_XS_DECREMENT). The purpose of BB_LX_INCREMENT is to make sure that the execution of coprocessor 2 on a particular burst of data happens after the data needed has arrived into the burst buffer memory 5 following a loadburst instruction. The purpose of BB_XS_DECREMENT is to make sure that the execution of a storeburst instruction follows the completion of the calculation (on the coprocessor 2) of the results that are to be stored back into main memory 3.

In this embodiment, the specific mechanism upon which these instructions act is a set of two counters that track, respectively:

the number of regions in burst buffer memory 5 ready to receive a storeburst; and the number of completed loadburst instructions.

Requests for data by the coprocessor 2 are performed by decrementing the LX counter, whereas the availability of data is signalled by incrementing the XS counter. These counters have to satisfy two properties: they must be accessible to only one system component at any given time, and they must have the ability to suspend the process that requests unavailable data.

The existing concept that matches most closely what is required is the semaphore, as described by Dijkstra ("[Dijkstra 1968] E. Dijkstra, "Co-operating Sequential Processes," in F. Genuys (Editor), Programming Languages, New York: Academic Press, (1968), pages 43-112.). The term "semaphore" is thus used to describe the counters employed in embodiments of the invention—it should be noted however that these counters are not identical to the semaphores described by Dijkstra, but broadly analogous.

The fundamental principles of the semaphore are as follows. A semaphore contains an integer value. Executing a Wait( ) instruction on a semaphore decrements this value, whereas executing a Signal( ) instruction increments it. Executing a Wait( ) on a semaphore whose value is already 0 stops the software process or hardware component which is trying to execute the Wait( ) until the value of the semaphore is increased.

In the present embodiment, the BB_XS_DECREMENT instruction would act like a Wait( ) on the XS semaphore (11 in FIG. 1) whereas the BB_LX_INCREMENT instruction would act like a Signal( ) on the LX semaphore (10 in FIG. 1). As will be described later, the coprocessor controller 9 would, conversely, perform a Wait( ) on the LX semaphore 10 and a Signal( ) on the XS semaphore 11. The semantics of these instructions can be the same as described in Dijkstra's paper, although the overall arrangement of Signal( ) and Wait( ) operations differs significantly from that described in the original paper. These instructions would be issued in the appropriate sequence (as is discussed further below), in order to make sure that the relative temporal ordering of certain events, necessary for the correctness of the system, is respected.

Memory Access Table (MAT) 65 will now be described with reference to FIG. 3. This is a memory descriptor table holding information relating to main memory locations involved in burst transactions. Each entry in the MAT is an indexed slot describing a transaction to main memory. In this embodiment, the MAT 65 comprises 16 entries, though different implementations are of course possible. Each entry comprises three fields:

1. Memory address (memaddr)—the start address of the relevant region in main memory. Ideally, this location is in physical memory space, as virtual address translation may result in a burst request spanning two physical pages, which would cause difficulties for the memory controller.
2. Extent (extent)—the extent of the transfer. This is the length of the transfer, multiplied by the stride, and gives the last address transferred plus one. The length of the transfer is calculated by the division of the extent by the stride, and this is automatically copied to the bufsize field of the related BAT 66 (see below) after a transfer has completed.
3. Stride (stride)—the interval between successive elements in a transfer.

memaddr: This is the 32 bit unsigned, word-aligned address of the first element of the channel burst.

extent: The parameter in the extent register is the address offset covering the range of the burst transfer. If the transfer requires L elements separated by a stride of S, then the extent is S*L.

stride: The parameter stride is the number of bytes skipped between accesses. Values of the transfer stride interval are restricted in the range of 1 to 1024. Values greater than 1024 are automatically truncated to 1024. Reads of this register return the value used for the burst (i.e. if truncation was necessary, then the truncated value is returned). Also, strides must be multiples of the memory bus width, which in this case is 4 bytes. Automatic truncation (without rounding) is performed to enforce this alignment An example of values contained by a MAT slot might be:
{0x1feelbad, 128, 16}
which results in a 32 word (32 4 byte words) burst, with each word separated by 4 words (4 4 byte words).

The auto-increment indicator bit of a burst instruction also has relevance to the MAT 65. If this bit is set in the burst instruction, the start address entry is increased to point to point to the next memory location should the burst have continued past 32. This saves processor overhead in calculating the start address for the next burst in a long sequence of memory accesses.

The buffer access table (BAT) 66 will now be described with reference to FIG. 3. This is again a memory descriptor table, in this case holding information relating to the burst buffer memory area 26. Each entry in the BAT 66 describes a transaction to the burst buffer memory area 26. As for the MAT 65, the BAT 66 comprises 16 entries, though can of course be varied as for the MAT 65. Each entry in this case comprises two fields:

1. Buffer address (bufaddr)—the start of the buffer in the buffer area
2. Buffer size (bufsize)—the size of the buffer area used at the last transfer The buffer address parameter bufaddr is the offset address for the first element of the channel-burst in the buffer area. The burst buffer area is physically mapped by hardware into a region of the processor's memory space. This means that the processor must use absolute addresses when accessing the burst buffer area. However, DMA transfers simply use the offset, so it is necessary for hardware to manage any address resolution required. Illegally aligned values may be automatically aligned by truncation. Reads of this register return the value used for the burst (i.e. if truncation was necessary, then the truncated value is returned). The default value is 0.

The parameter bufsize is the size of the region within the buffer area occupied by the most recent burst. This register is automatically set on the completion of a burst transfer which targeted its entry. Note that the value stored is the burst length, since a value of 0 indicates an unused buffer entry. This register may be written, but this is only useful after a context switch when buffers are saved and restored. The default value is again 0.

Programming MAT and BAT entries is performed through the use of BB_SET_MAT and BB_SET_BAT instructions. The entry parameter determines the entry in the MAT (or BAT) to which the current instruction refers.

Further details of the burst buffer architecture and the mechanisms for its control are provided in European Patent Application No. 97309514.4 and the corresponding U.S. patent application Ser. No. 09/3,526. The details provided above are primarily intended to show the architectural elements of the burst buffer system, and to show the functional effect that the burst buffer system can accomplish, together with the inputs and outputs that it provides. The burst buffer system is optimally adapted for a particular type of computational model, which is developed here into a computational model for the described embodiment of the present invention. This computational model is described further below.

The burst instruction queue 6 has been described above. A significant aspect of the embodiment is that instructions are similarly provided to the coprocessor through a coprocessor instruction queue 8. The coprocessor instruction queue 8 operates in connection with the coprocessor controller 9, which determines how the coprocessor receives instructions from the processor 1 and how it exchanges data with the burst buffer system 5.

Use of the coprocessor instruction queue 8 has the important effect that the processor 1 itself is decoupled from the calculation itself. During the calculation, processor resources are thus available for the execution of other tasks. The only situation which could lead to operation of processor 1 being stalled is that one of the instruction queues 6,8 is full of instructions. This case can arise when processor 1 produces instructions for either queue at a rate faster than that at which instructions are consumed. Solutions to this problem are available. Effectiveness can be improved by requiring the processor 1 to perform a context switch and return to service these two queues after a predefined amount of time, or upon receipt of an interrupt triggered by the fact that the number of slots occupied in either queue has decreased to a predefined amount. Conversely, if one of the two queues becomes empty because the processor 1 cannot keep up with the rate at which instructions are consumed, the consumer of those instructions (the coprocessor controller 9 or the burst buffer controller 7) will stall until new instructions are produced by the processor 1.

Modifications can also be provided to the architecture which ensure that no further involvement from the processor 1 is required at all, and these will be discussed in the final part of this specification.

The basic functions of the coprocessor controller 9 are to fetch data from the burst buffer memory 5 to the coprocessor 2 (and vice versa), to control the activity of the coprocessor, and to synchronise the execution of the coprocessor 2 with the appropriate loads from, or stores to, the burst buffer memory 5. To achieve these functions, the coprocessor controller may be in essence a relatively simple state machine able to generate addresses according to certain rules.

Figure 4:
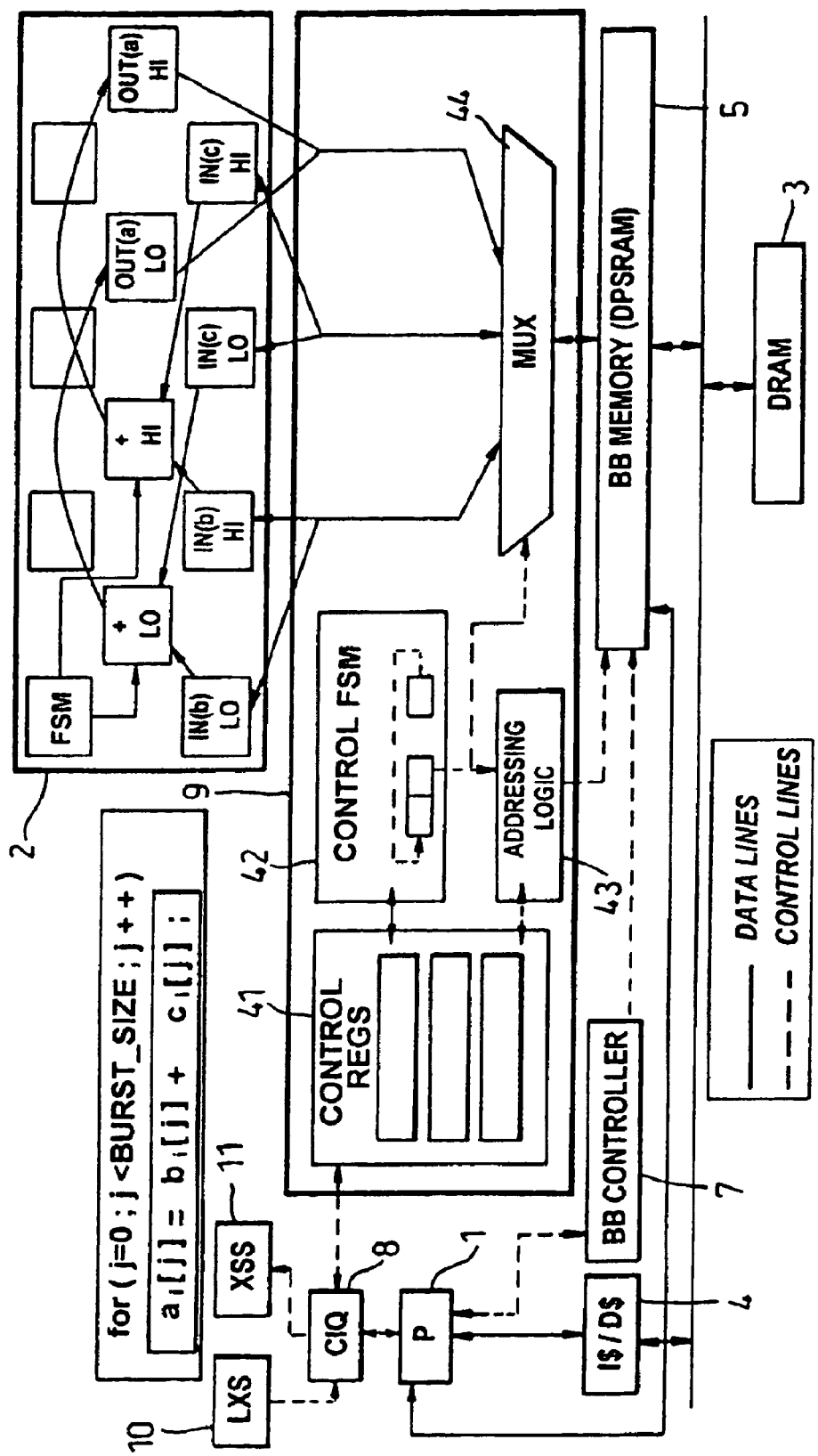
FIG. 4 shows the structure of a coprocessor controller used in the system of FIG. 1 and its relationship to other system components.

FIG. 4 shows the coprocessor controller 9 in its relationship to the other components of the architecture, and also shows its constituent elements and its connections with other elements in the overall architecture. Its exact function depends on the type of inputs and outputs required by the coprocessor 2 and its initialisation requirements (if any), and so may vary in detail from that described below. In the case of a CHESS coprocessor, these inputs and outputs are input and output data streams exchanged with the burst buffer memory 5.

Coprocessor controller 9 performs two main tasks:
control of the communication between the coprocessor 2 and the burst buffer memory 5; and
maintenance of a system state through the use of a control finite state machine 42.

The coprocessor 2 accesses data in streams, each of which is given an association with one of a number of control registers 41. Addresses for these registers 41 are generated in a periodic fashion by control finite state machine 42 with addressing logic 43, according to a sequence generated by the finite state machine 42.

At every tick of a clock within the finite state machine 42, the finite state machine gives permission for (at most) one of the registers 41 to have a new address generated for it and the address used to allow the register 41 to address the burst buffer memory 5. At the same time, an appropriate control signal is generated by the finite state machine 42 and sent to a multiplexer 44 so that the appropriate address is sent to the burst buffer memory 5, together with the correct read/write signal. A specific read/write signal is associated with each register 41, with a value which does not change throughout the whole computation.

After an address obtained for a register 41 has been used to address memory, a constant quantity is added to its value, generally the same as the width of the connection between the coprocessor 2 and the burst buffer memory 5. That is, if the width of this connection is 4 bytes, then the increment made to counter 41 will be 4. This is essentially comparable to "stride" in the programming of burst buffers.

The coprocessor controller mechanism described above allows the multiplexing of different data streams along a single bus. Each of the data streams can be considered to access the single shared bus through its own port.

For this system to operate such that the integrity of communication is ensured, it is necessary that at the other end of the bus the coprocessor 2 is ready to read from and write to this bus in a synchronous manner. It is the responsibility of the application software (and, specifically, to the part of the application software that configures coprocessor 2) to ensure that:

no two streams try and access the bus at the same time; and that
the execution of coprocessor 2 is synchronous with the data transfer to and from burst buffer memory 5.

This latter requirement ensures that the coprocessor 2 is ready to read the data placed by the burst buffers memory 5 on the connection between the two devices, and vice-versa.

Although more than one physical line could usefully be provided between the Chess array 2 and the burst buffer memory 5, the general need for multiplexing would still remain. Unless the number of physical connections between the coprocessor 2 and the burst buffer memory 5 is greater than or equal to the total number of logical I/O streams for the coprocessor 2, it will always be true that two or more logical streams have to be multiplexed on the same wire. Technological reasons related to the design of fast SRAM (as is advantageously used for the burst buffer memory 5) discourage the use of more than one connection with the coprocessor 2.

The coprocessor controller 9 also acts to control the execution of the CHESS array comprising coprocessor 2 so that it will run for a specified number of clock cycles. This is achieved by the counter in the control finite state machine 42 ticking for the specified number of cycles before "freezing" the CHESS array by "gating" (that is, stopping) its internal clock, in a way that does not affect the internal state of the pipelines in the coprocessor 2. This number of ticks is specified using the CC_START_EXEC instruction, described below.

Coprocessor controller 9 is programmed by processor 1 through the use of the coprocessor instruction queue 8. A possible instruction set for this coprocessor controller 9 is shown in Table 2 below.

TABLE 2

| Coprocessor controller instruction set | | |
|---|---|---|
| Opcode | Parameter Value | Comment |
| CC_CURRENT_PORT | n (integer) | Port # the next CC_PORT_xxx commands will refer to |
| CC_PORT_PERIOD | (integer) | Period of activity of a port |
| CC_PORT_PHASE_START | $_{start}$ (integer) | Phase start of the activity of a port |
| CC_PORT_PHASE_END | $_{end}$ (integer) | Phase end of the activity of a port |
| CC_PORT_TIME_START | $t_{start}$ (integer) | Start cycle of the activity of a port |
| CC_PORT_TIME_END | $t_{end}$ (integer) | End cycle of the activity of a port |
| CC_PORT_ADDRESS | $addr_{start}$ (integer) | Initial address for a port |

TABLE 2-continued

Coprocessor controller instruction set

| Opcode | Parameter Value | Comment |
|---|---|---|
| CC_PORT_INCREMENT | $addr_{end}$ (integer) | Address increment for a port |
| CC_PORT_IS_WRITE | rw (boolean) | Read/Write flag |
| CC_START_EXEC | $n_{cycles}$ (integer) | Start/Resume the execution of coprocessor 2 for a determined # of cycles |
| CC_LX_DECREMENT | N/A | Decrement the value of the LX semaphore |
| CC_XS_INCREMENT | N/A | Increment the value of the XS semaphore |

For the aforementioned instructions, different choices of instruction format could be made. One possible format is a 32-bit number, in which 16 bits encode the opcode, and 16 bits encode the optional parameter value described above.

The semantics of individual instructions are as follows:

CC_CURRENT_PORT selects one of the ports as the recipient of all the following CC_PORT_xxx instructions, until the next CC_CURRENT_PORT CC_PORT_PERIOD ( ) sets the period of activation of the current port to the value of the integer parameter CC_PORT_PHASE_START/CC_PORT_PHASE_END ($_{start\ end}$) set the start/end of the activation phase of the current port to the value of the integer parameter ($_{start\ end}$)

CC_PORT_TIME_START/CC_PORT_TIME_END ($t_{start}\ t_{end}$) set the first/last cycle of activity of the current port CC_PORT_ADDRESS ($addr_{start}$) sets the current address of the current port to the value of the integer parameter $addr_{start}$ CC_PORT_INCREMENT ($addr_{iner}$) sets the address increment of the current port to the value of the integer parameter $addr_{iner}$ CC_PORT_IS_WRITE (rw) sets the data transfer direction for the current port to the value of the Boolean parameter rw CC_START_EXEC $n_{cycles}$ initiates the execution of coprocessor controller 2 for a number of clock cycles specified by the associated integer parameter $n_{cycles}$;

CC_LXS_DECREMENT decrements (in a suspensive manner, as previously described) the value of the LX semaphore;

CC_XSS_INCREMENT increments the value of the XS semaphore.

A port is defined as active (that is, it has control of the communication with the burst buffer memory 5) if the current value of counter 42, $t_{cur}$, is such that $t_{start}\ t_{cur} < t_{end}$, and start ($t_{cur}$ mod)<$_{end}$. This allows the possibility of systems in which, for instance, two streams exist, with equal period, say 5, and one has control of the BB memory for the first 4 cycles, and the other has control for the remaining cycle.

The process of executing an algorithm using this architecture involves first the programming of the coprocessor 2, then programming or initialisation of the coprocessor controller 9 and the burst buffer controller 7, followed by the actual execution of the algorithm.

For the initialisation of the coprocessor 2, it will generally be most straightforward for the configuration to be loaded into the coprocessor itself by means specific to the actual embodiment of the device.

For the programming of the coprocessor controller 9, the steps are as follows:

1. The main coprocessor controller 9 is configured according to the total number, periods, phases and address increments for every logical stream present in the Chess array, as described before. An example of the programming of the coprocessor controller 9 to perform the desired functions is provided below.

2. The next step in the configuration of coprocessor controller 9 is address configuration. Although it is likely that the characteristics (period, phase) of every logical stream will remain the same throughout an algorithm, the actual addresses accessed by the coprocessor controller 9 in the burst buffers memory 5 will vary. It is this variability which allows the burst buffers controller 7 to perform double-buffering in a straightforward manner within the burst buffers architecture. The effect of this double-buffering, as previously stated, is to give the coprocessor 2 the impression that it is interacting with continuous streams, whereas in fact buffers are being switched continuously.

The burst buffers controller 7 also needs to be configured. To do this, the appropriate commands have to be sent to the burst instruction queue 6 in order to configure the transfers of data to and from main memory 3 into the burst buffers memory 5. These instructions (BB_SET_MAT and BB_SET_BAT) configure the appropriate entries within the BAT and the MAT, in a manner consistent with the programming of the coprocessor controller 9. In this embodiment, the instructions to program the MAT and the BAT entries are issued through the burst instruction queue 6. An alternative possibility would be the use of memory-mapped registers which the processor 1 would write to and read from. As in the present embodiment there is no possibility of reading from memory-mapped registers (as they are not present), processor 1 cannot query the state of the burst buffer controller 7—however, this is not a significant limitation. Furthermore, the use of the burst instruction queue 6 for this purpose allows the possibility of interleaving instructions to configure MAT and BAT entries with the execution of burst transfers, thus maintaining correct temporal semantics without the supervision of the processor 1.

After these steps have been performed, the actual execution of the CHESS array can be started. It is necessary in this embodiment only to instruct the CHESS array to run for a specified number of cycles. This is achieved by writing the exact number of cycles as a parameter to a CC_START_EXEC instruction in the coprocessor instruction queue 8, so that this data can then be passed to the coprocessor controller 9. One clock cycle after this value has been transferred into coprocessor controller 9, the controller starts transferring values between the burst buffer memory 5 and the CHESS array of coprocessor 2, and enables the execution of the CHESS array.

An important step must however be added before instructions relating to the computation are placed in the respective instruction queues. This is to ensure the necessary synchronisation mechanisms are in place to implement successfully the synchronisation and double-buffering principles. The basic element in this mechanism is that the coprocessor controller 9 will try to decrement the value of the LX semaphore and will suspend coprocessor operation until it can do so, according to the logic described above. The initial value of this semaphore is 0: the coprocessor controller 9 and the coprocessor 2 are hence "frozen" at this stage. Only when the value of the LX semaphore is incremented by the burst buffers controller 7 after a successful loadburst instruction will the coprocessor 2 be able to start (or resume) its execution. To achieve this effect, a CC_LX_DECREMENT instruction is inserted in the coprocessor instruction queue 8 before the "start coprocessor 2 execution" (CC_START_EXEC) instruction. As will be shown, a corresponding "increment the LX semaphore" (BB_LX_INCREMENT) instruction will be inserted in the burst instruction queue 6 after the corresponding loadburst instruction.

The actual transfer of data between CHESS logical streams and the burst buffer memory 5 is carried out in accordance with the programming of the coprocessor controller 9 as previously described.

The number of ticks for which the counter 42 has to run depends on how long it takes to consume one or more input bursts. It is left to the application software to ensure the correctness of the system. The programming of the counter 42 must be such that, once a buffer has been consumed, the execution of coprocessor 2 will stop. The next instruction in the coprocessor instruction queue 8 must be a synchronisation instruction (that is, a CC_LX_DECREMENT), in order to ensure that the next burst of data has arrived into the burst buffers memory 5. Following this instruction (and, possibly, a waiting period until the data required is available), the initial address of this new burst of data is assigned to the data stream (with a CC_PORT_ADDRESS instruction), and execution is resumed via a CC_START_EXEC instruction. The procedure is similar for output streams (with the important difference that there will be no waiting period equivalent to that required for data to arrive from main memory 3 into burst buffers memory 5).

Computational Model

Figure 5:
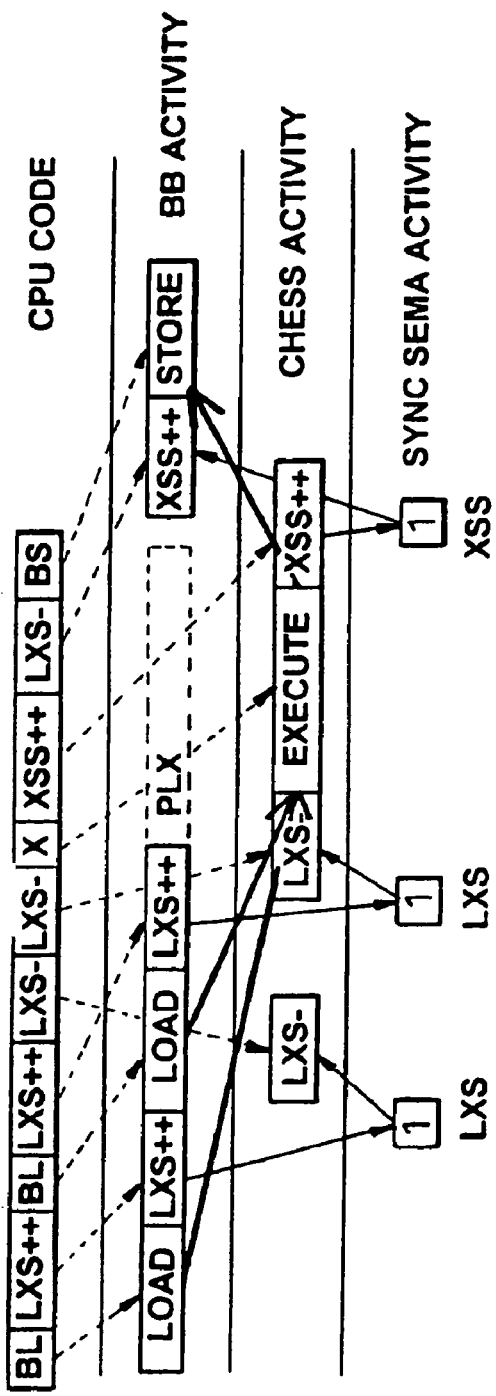
FIG. 5 shows an example to illustrate a computational model usable on the system of FIG. 1.

An illustration of the overall computation model will now be described, with reference to FIG. 5. The illustration indicates how an algorithm can be recoded for use in this architecture, using as an example a simple vector addition, which can be coded in C for a conventional microprocessor as:

int a[1024], b[1024], c[1024];

for (i=0;i<1024;i++)
   a [i]=b[i]+c[i];

A piece of C code to run processor 1 which achieves on the architecture of FIG. 1 the same functionality as the original vector addition loop nest is as follows:

```
 0: int a[1024], b[1024] c[1024];
 1: int eo, not_eo, k;
 2: /*Port 0 specification: port #, increment, xfer size, period,
 3: phase start, phase end, start time, end time, r/w*/
 4: CIQ_STREAM( 0, 4, 4, 3, 0, 1, 0, 3*BLEN*MAXK+3, 0 );
 5: /*Port 1 specification*/
 6: CIQ_STREAM( 1, 4, 4, 3, 1, 2, 0, 3*BLEN*MAXK+3, 0 );
 7: /*Port 2 specification*/
 8: CIQ_STREAM( 2, 4, 4, 3, 2, 3, 0, 3*BLEN*MAXK+3, 1 );
 9: BIQ_SET_MAT(0, &b[0], BLEN*4, 4);
10: BIQ_SET_MAT(1, &c[0], BLEN*4, 4);
11: BIQ_SET_MAT(2, &a[0], BLEN*4, 4);
12: BIQ_SET_BAT(0, 0x0000, BLEN*4); BIQ_SET_BAT(1, 0x0100, BLEN*4);
13: BIQ_SET_BAT(2, 0x0200, BLEN*4); BIQ_SET_BAT(3, 0x0300, BLEN*4);
14: BIQ_SET_BAT(4, 0x0400, BLEN*4); BIQ_SET_BAT(5, 0x0500, BLEN*4);
```

-continued

```
15: for( k = 0; k < MAXK; k++ )
16: {
17:     /*Even or odd iteration? - For double buffering*/
18:     eo = k&0x1;
19:     CIQ_LXD(2);
20:     CIQ_SA(0, (BLEN*4*eo));
21:     CIQ_SA(1, ((2*BLEN*4)+BLEN*4*eo));
22:     CIQ_SA(2, ((4*BLEN*4)+BLEN*4*eo));
23:     /*Start Chess*/
24:     CIQ_ST(3*BLEN);
25:     CIQ_XSI(1);
26:     /*BB stuff*/
27:     /*Load A*/
28:     BIQ_FLB(0,eo);
29:     /*Load B*/
30:     BIQ_FLB(2,2+eo);
31:     BIO_LXI(2);
32:     if( k >= 1)
33:     {
34:         not_eo = (eo==0)?1:0;
35:         BIQ_XSD(1);
36:         BIQ_FSB(4,4+not_eo);
37:     }
38: }
39: eo = MAXK & 0x1;
40: not eo = (eo==0)?1:0;
41: BIQ_XSD(1);
42: BIQ_FSB(4,4+not_eo);
```

In this arrangement, three ports are used in coprocessor controller 9: one for each input vector (b and c) and one for the output vector (a). The statements at lines 4, 6 and 8 are code macros to initialise these three ports. These, when expanded, result in the following commands (this is with reference to line 4—the other expanded macros are directly analogous):

CC_CURRENT_PORT(0);

CC_PORT_INCREMENT(4);

CC_TRANSFER_SIZE(4);

CC_PORT_PERIOD(3);

CC_PORT_PHASE_START(0);

CC_PORT_PHASE_END(1);

CC_PORT_START_TIME(0);

CC_PORT_END_TIME(3*BLEN*MAXK+3);

CC_PORT_IS_WRITE(0);

This code has the effect that port 0 will read 4 bytes of data every $3^{rd}$ tick of counter 42, and precisely at ticks 0, 3, 6 . . . 3*BLEN*MAXK+3, and will increment the address it reads from by 4 bytes each time. BLEN*MAXK is the length of the two vectors to sum (in this case, 1024), and BLEN is the length of a single burst of data from DRAM (say, 64 bytes). With these values, MAXK will be set to 1024/64=16.

Lines 9 to 14 establish MATs and BATs for the burst buffers transfers, tying entries in these tables to addresses in main memory 3 and burst buffers memory 5. The command BIQ_SET_MAT(0, &b[0], BLEN*4, 4, TRUE) is a code macro that is expanded into BB_SET_MAT(0, &b[0], BLEN*4, 4) and ties entry 0 in the MAT to address &b[0], sets the burst length to be BLEN*4 bytes (that is, BLEN integers, if an integer is 32 bits) and the stride to 4. The two lines that follow are similar and relate to c and a. The line BIQ_SET_BAT(0, 0x0000, BLEN*4) is expanded to BB_SET_BAT(0, 0x000, BLEN*4) and ties entry 0 of the BAT to address 0x0000 in the burst buffers memory 5. The two lines that follow are again similar.

Up to this point, no computation has taken place; however, coprocessor controller 9 and burst buffers controller 7 have been set up. The loop nest at lines 15 to 38 is where the actual computation takes place. This loop is repeated MAXK times, and each iteration operates on BLEN elements, giving a total of MAXK*BLEN elements processed. The loop starts with a set of instructions CIQ_xxx sent to the coprocessor instruction queue 8 to control the activity of the coprocessor 2 and coprocessor controller 9, followed by a set of instructions sent to the burst instruction queue 6 whose purpose is to control the burst buffers controller 7 and the burst buffers memory 5. The relative order of these two sets is in principle unimportant, because the synchronisation between the different system elements is guaranteed explicitly by the semaphores. It would even be possible to have two distinct loops running after each other (provided that the two instruction queues were deep enough), or to have two distinct threads of control.

The CIQ_xxx lines are code macros that simplify the writing of the source code. Their meaning is the following:

CIQ_LXD(N) inserts N CC_LXS_DECREMENT instructions in the coprocessor instruction queue 8;

CIQ_SA(port, address) inserts a CC_CURRENT_PORT (port) and a CC_PORT_ADDRESS(address) instruction in the coprocessor instruction queue 8;

CIQ_ST(cycleno) inserts a CC_EXECUTE_START (cycleno) instruction in order to let the coprocessor 2 execute for cycleno ticks of counter 42; and CIQ_XSI(N) inserts N CC_XSS_INCREMENT instructions in the coprocessor instruction queue 8.

The net effect of the code shown above is to:

synchronise with a corresponding loadburst on the LXS semaphore;

start the computation on coprocessor 2 for 3*BLEN ticks of counter 42; and synchronise with a corresponding storeburst on the XSS semaphore.

The BIQ_xxx lines are again code macros that simplify the writing of the source code. Their meaning is as follows:

BIQ_FLB(mate,bate) inserts a BB_LOADBURST(mate, bate, TRUE) instruction into the burst instruction queue 6;

BIQ_LXI(N) inserts N BB_LX_INCREMENT instructions in the burst instruction queue 6;

BIQ_FSB(mate,bate) inserts a BB_STOREBURST(mate, bate, TRUE) instruction into the burst instruction queue 6; and BIQ_XSD(N) inserts N BB_XS_DECREMENT instructions in the burst instruction queue 6.

The net effect of the code shown above is to load two bursts from main DRAM memory 3 into burst buffers memory 5, and then to increase the value of the LX semaphore 10 so that the coprocessor 2 can start its execution as described above. In all iterations but the first one, the results of the computation of coprocessor 2 are then stored back into main memory 3 using a storeburst instruction. It is not strictly necessary to wait for the second iteration to store the result of the computation executed in the first iteration, but this enhances the parallelism between the coprocessor 2 and the burst buffers memory 5.

The use of the two variables eo and not_eo is a mechanism used here to allow the double-buffering effect described previously.

Lines 39 to 42 perform the last burst transfer to main memory 3 from burst buffers memory 5, compensating for the absence of a storeburst instruction in the first iteration of the loop body.

Figure 6:
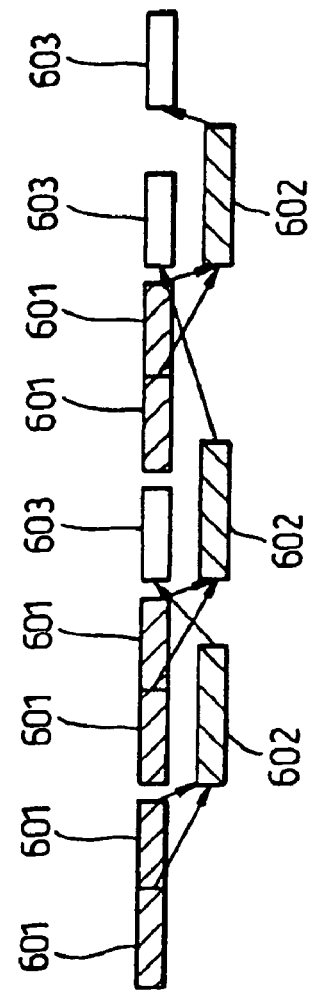
FIG. 6 shows a timeline for computation and I/O operations for the example of FIG. 5.

The resulting timeline is as shown in FIG. 6. Loadbursts 601 are the first activity (as until these are completed the coprocessor 2 is stalled by the load/execute semaphore), and when these are completed the coprocessor 2 can begin to execute 602. The next instruction in the burst instruction queue 6 is another loadburst 601, which is carried out as soon as the first two loads have finished. Then, the next instruction in the burst instruction queue 6 is a storeburst 603, which has to wait until the XS semaphore 11 signals that the first computation on coprocessor 2 has completed. This process continues throughout the loop.

Although the example indicated above is for a very simple algorithm, it illustrates the basic principles required in calculations that are more complex. The person skilled in the art could use the approach, principles and techniques indicated above for programming the architecture of FIG. 1 to adapt more complex algorithms for execution by this architecture.

Tool Chain for Computation

The principles of the computation model can be exploited in straightforward fashion by hand coding—that is, manually writing C code to run on the CPU adapted in conventional manner to schedule the appropriate operation of the system components (to place instructions in the appropriate queues, and to set the system components into operation as described), and to provide an appropriate configuration for the coprocessor in accordance with the standard synthesis tools for configuring that coprocessor. For a configurable or FPGA-based processor like CHESS, this tool will generally be a hardware description language. An appropriate hardware description language to use for CHESS is JHDL, described in, for example, "JHDL—An HDL for Reconfigurable Systems" by Peter Bellows and Brad Hutchings, *Proceedings of the IEEE Symposium on Field-Programmable Custom Computing Machines*, April 1998.

A preferred alternative is for a specific toolchain to be used for this computational architecture. The elements of such a toolchain and its practical operation are described briefly below.

The toolchain has the function of converting conventional sequential code to code adapted specifically for effective operation, and interoperation, of the system components. The exemplary toolchain receives as input C code, and provides as output the following:

a CHESS coprocessor configuration for execution of the computation;

burst buffer schedule for moving data between the system memory and the burst buffer memory; and a coprocessor controller configuration for moving data between the CHESS coprocessor and the burst buffer memory.

The toolchain itself has two components. The first is a frontend, which takes C code as its input and provides annotated dependence graphs as its output. The second component is a backend, which takes the dependence graphs generated by the frontend, and produces from these the CHESS configuration, the burst buffers schedule, and the coprocessor controller configuration.

The main task of the frontend is to generate a graph which aptly describes the computation as it is to happen in coprocessor 2. One of the main steps performed is value-based dependence analysis, as described in W. Pugh and D. Wonnacott, "An Exact Method for Analysis of Value-based Array Data Dependences", University of Maryland, Institute for Advanced Computer Studies—Dept. of Computer Science, University of Maryland, December 1993. The output generated is a description of the dataflow to be implemented in the CHESS array and a representation of all the addresses that need to be loaded in as inputs (via loadburst instructions) or stored to as outputs (via storeburst instructions), and of the order in which data has to be retrieved from or stored to the main memory 3. This is the basis upon which an efficient schedule for the burst buffers controller 7 will be derived.

If we assume, as an example, the C code for a 4-tap FIR filter:

int i, j, src[ ], kernel[ ], dst[ ];

for(i = 0; i < 1000; i++)
  for(j = 0; j < 4; j++)
    dst[i] = dst[i] + src[4+i−j]*kernel[j];

as the input to the frontend, the output, provided as a text file, will have the following form:

loop:0<=i<999 #loop nest description loop:0<=j<4

16:str/0/0/20/ #store instruction

LOD:

Array:d[1/0/0] at line 11

20:ldc/16/0/0/ #load constant

22:str/0/0/26/ #store instruction, which

LOD: 4 <= j #writes its outputs to main

Array:d[1/0/0] at line 13 #memory if 4<=j

26:add/22/27/31/ #addition

27:lod/26/0/0/ #load instruction, taking its inputs

Dep(16): [0] [0] / Range: j <= 0 #from instruction 16 if j<=0

Dep(22): [0] [1] / Range: 1 <= j #from instruction 22 otherwise

LID:

Array:d[1/0/0] at line 13

31:mul/26/32/37/ #multiplication

32:lod/31/0/0/ #load instruction

Dep(32): [1] [1] / Range: 1 <= i && 1 <= j

LID: i <= 0 || j <= 0 && 1 <= i #which takes its inputs from main

Array:src[1/−1/0] at line 13 #memory if i <= 0 || j <= 0 && 1 <= i

37:lod/31/0/0/

Dep(37): [1] [0] / Range: 1 <= i #load instruction

LID: i <= 0 #taking its inputs from main memory if

Array:kernel[0/1/0] at line 13 #i<=0

Figure 7:
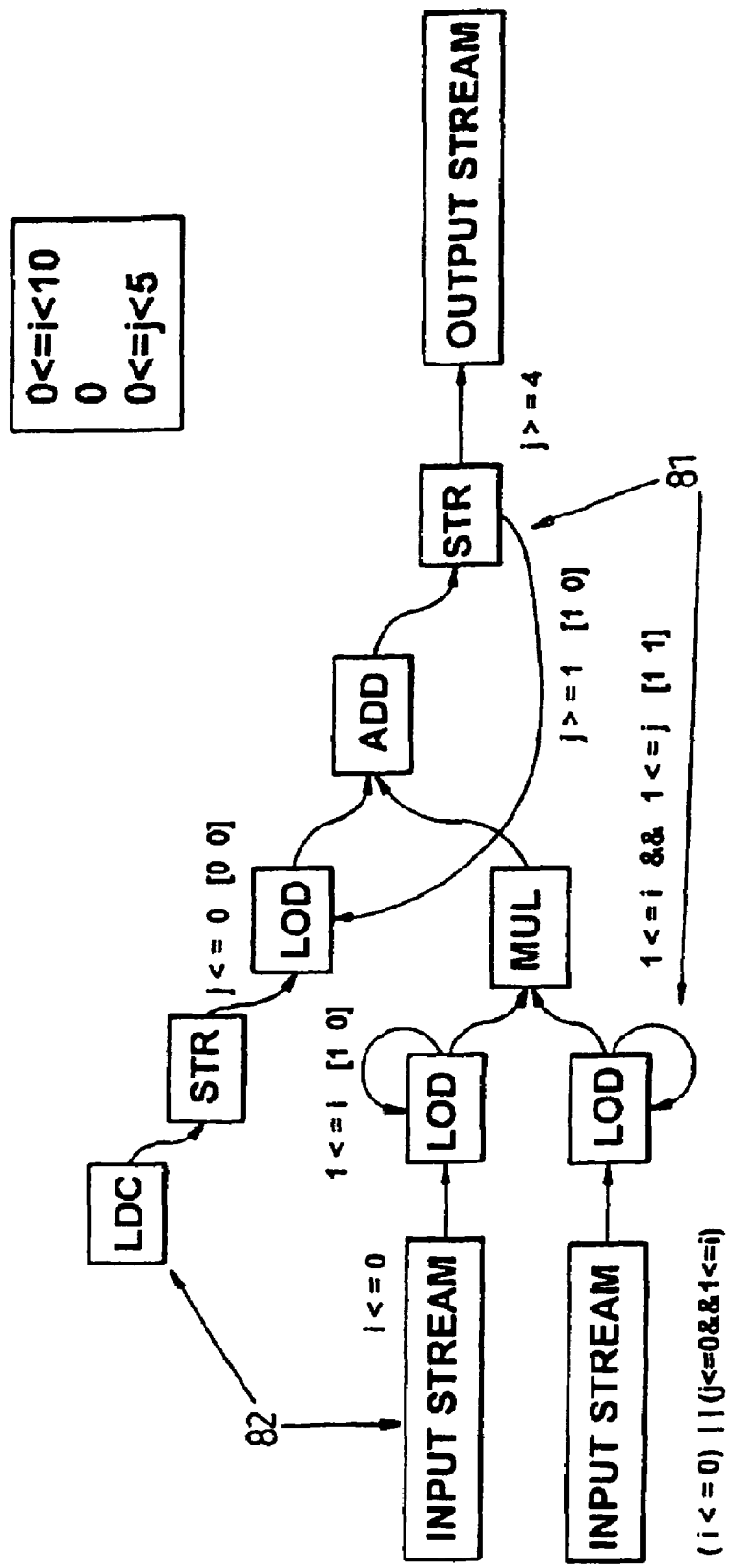
FIG. 7 shows an annotated graph provided as output from the frontend of a toolchain useful to provide code for the system of FIG. 1.

This text file is a representation of an annotated graph. The graph itself is shown in FIG. 7. The graph clearly shows the dependencies found by the frontend algorithm.

Edges 81 are marked with the condition under which a dependence exists, and the dependence distance where applicable. The description provided contains all the information necessary to generate a hardware component with the required functionality.

Figure 8:
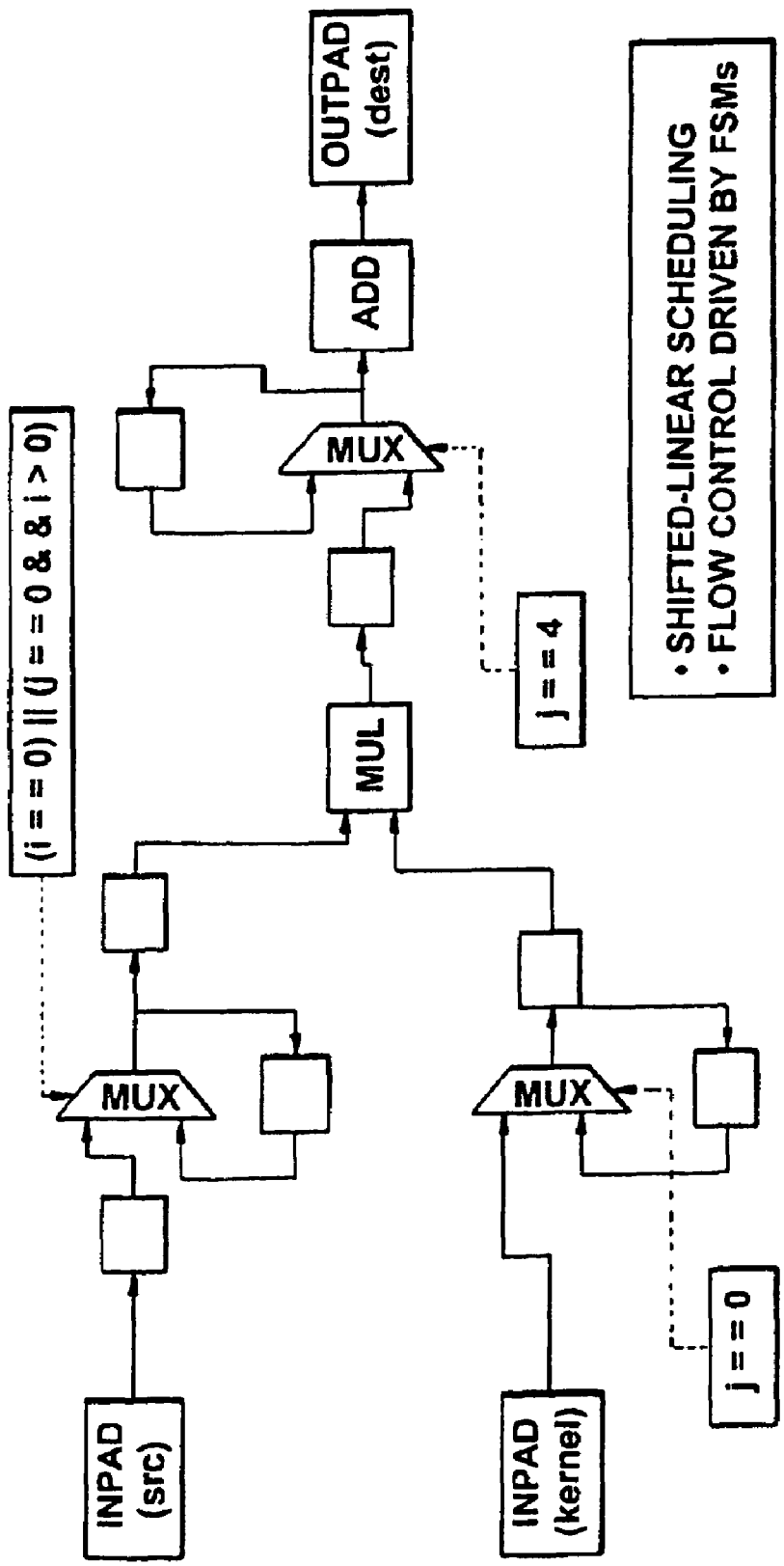
FIG. 8 shows a coprocessor internal configuration derived from the specifications in FIG. 7.

The backend of the compilation toolchain has certain basic functions. One is to schedule and retime the extended dependence graph obtained from the frontend. This is necessary to obtain a fully functional CHESS configuration. Scheduling involves determining a point in time for each of the nodes 82 in the extended dependence graph to be activated, and retiming involves, for example, the insertion of delays to ensure that edges propagate values at the appropriate moment. Scheduling can be performed using shifted-linear scheduling, a technique widely used in hardware synthesis. Retiming is a common and quite straightforward task in hardware synthesis, and merely involves adding an appropriate number of registers to the circuit so that different paths in the circuit meet at the appropriate point in time. At this point, we have a complete description of the functionality of the coprocessor 2 (here, a CHESS coprocessor). This description is shown in FIG. 8. This description can then be passed on to the appropriate tools to generate the sequence of signals (commonly referred to as "bitstream") necessary to program the CHESS coprocessor with this functionality.

Another function required of the backend is generation of the burst buffer and coprocessor controller schedule. Once the CHESS configuration has been obtained, it is apparent when it needs to be fed with values from main memory and when values can be stored back to main memory, and the burst buffer schedule can be established. Accordingly, a step is provided which involves splitting up the address space of all the data that needs to be loaded into or stored from the burst buffers memory 5 into fixed bursts of data that the burst buffers controller 7 is able to act upon.

For instance, in the FIR example just presented, the input array (src[ ]) is split into several bursts of appropriate sizes, such that all the address range needed for the algorithm is covered. This toolchain uses bursts of length $B_{len}$ (where $B_{len}$ is a power of 2, and is specified as an execution parameter to the toolchain) to cover as much of the input address space as possible. When no more can be achieved with this burst length, the toolchain uses bursts of decreasing lengths: $B_{len}/2$, $B_{len}/4$, $B_{len}/8$, . . . , 2, 1 until every input address needed for the algorithm belongs to one and only one burst.

For each one of these bursts, the earliest point in the iteration space in which any of the data loaded is needed is computed. In other words, to each input burst there is associated one point in the iteration space for which it is guaranteed that no earlier iterations need any of the data loaded by the burst. It is easy to detect when the execution of the coprocessor 2 would reach that point in the iteration space. There are thus created:

a loadburst instruction for the relevant addresses, in order to move data into burst buffer memory 5; and
  a corresponding synchronisation point (a CC_LX_DECREMENT/BB_LX_INCREMENT pair) to guarantee that the execution of coprocessor 2 is synchronised with the relevant loadburst instruction.

To achieve an efficient overlap of computation and communication, the loadburst instruction has to be issued in advance, in order to hide the latency associated with the transfer of data over the bus.

All the output address space that has to be covered by the algorithm is partitioned into output bursts, according to a similar logic. Again, the output space is partitioned into bursts of variable length.

The toolchain creates:

a storeburst instruction for the relevant addresses;

a corresponding synchronization point (BB_XS_DECREMENT/CC_XS_INCREMENT pair)

At this point, we possess information relevant to:

the relative ordering of loadburst and storeburst instructions, and their parameters of execution (addresses, etc.)

their position relative to the computation to be performed on coprocessor 2.

This information is then used to generate appropriate C code to organise the overall computation, as in the FIR example described above.

The actual code generation phase (that is, the emission of the C code to run on processor 1) can be accomplished using the code generation routines contained in the Omega Library of the University of Maryland, available at http://www.cs.umd.edu/projects/omega/, followed by a customised script that translates the generic output of these routines into the form described above.

Experimental Results—Image Convolution

An image convolution algorithm is described by the following loop nest:

for(i=0;i<IMAGE_HEIGHT;i++)

for(j=0;j<IMAGE_WIDTH;j++)

for(k=0;k<KERNEL_HEIGHT;k++)

for(l=0;l<KERNEL_WIDTH;l++)

Dest[i,j] += Source[(i+1)−k,(j+1)−l]*C[k,l];

Replication has been used to enhance the source image by KERNEL_HEIGHT-1 pixels in the vertical direction and KERNEL_WIDTH-1 pixels in the horizontal direction in order to simplify boundary conditions. Two kernels are used in evaluating system performance: a 3×3 kernel and a 5×5 kernel, both performing median filtering.

Figure 9:
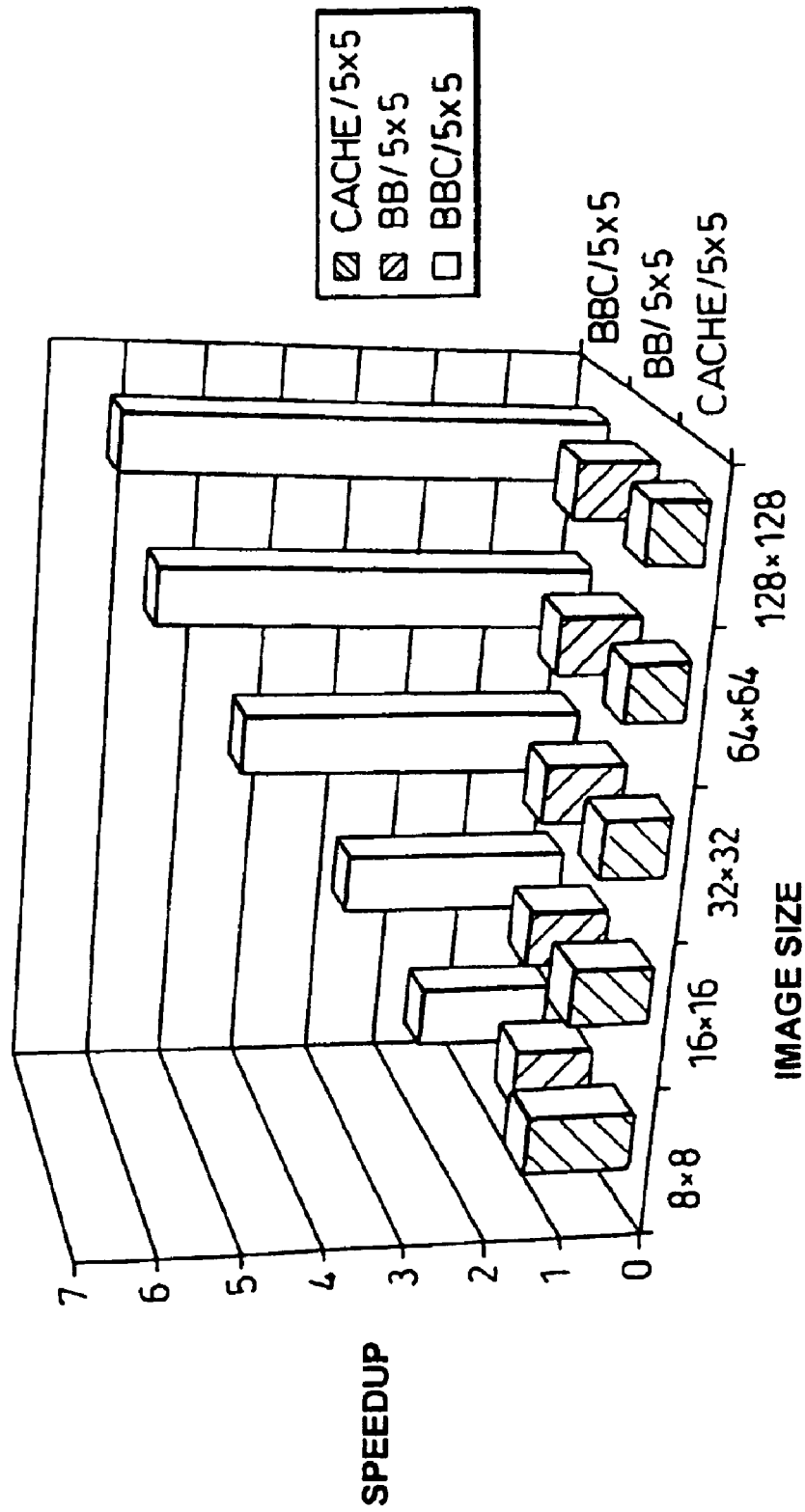
FIG. 9 shows the performance of alternative architectures for a 5×5 image convolution using 32 bit pixels.
Figure 10:
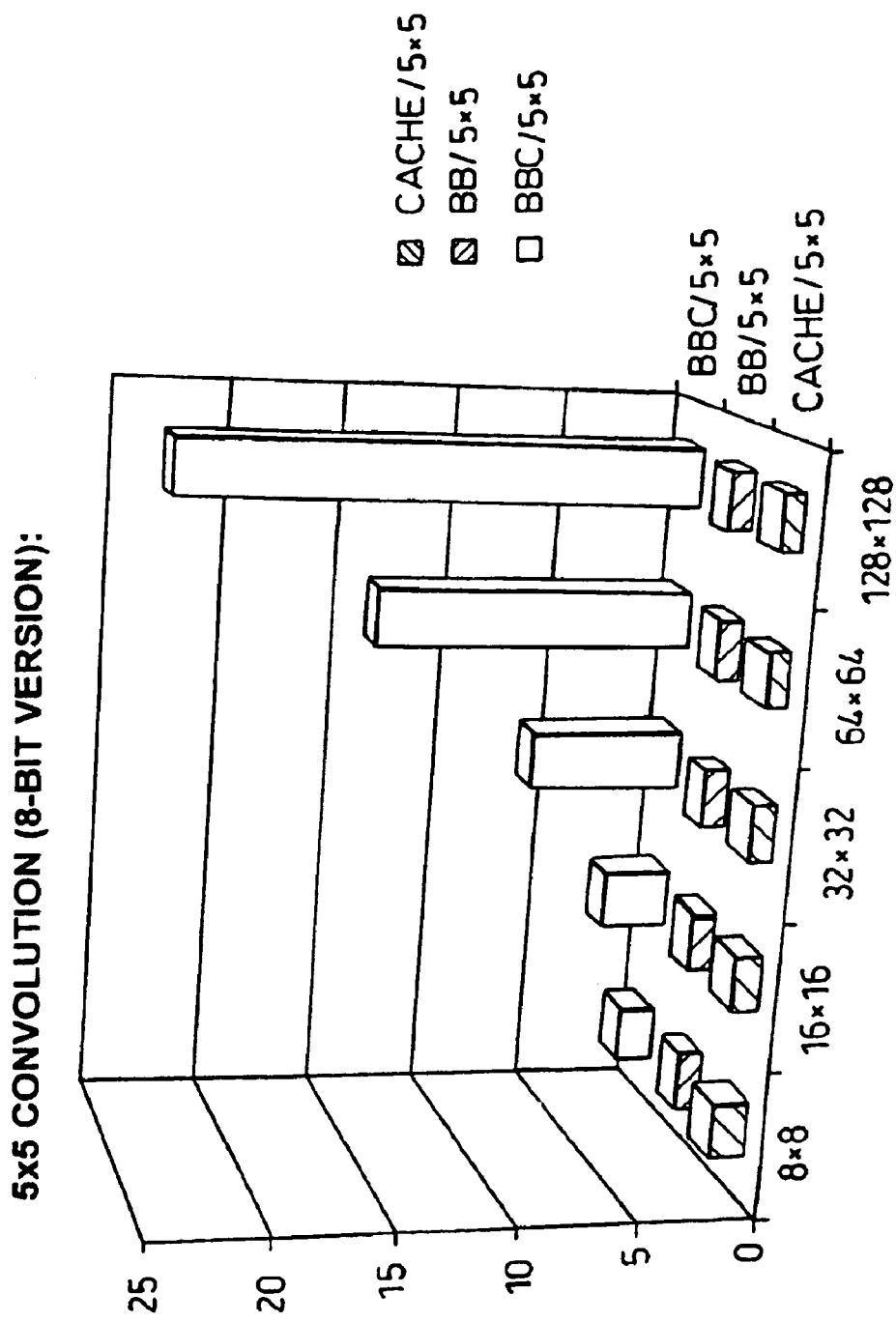
FIG. 10 shows the performance of the alternative architectures used to produce FIG. 9 for a 5×5 image convolution using 8 bit pixels.

FIGS. 9 and 10 illustrate the performance of the architecture according to an embodiment of the invention (indicated as BBC) as against a conventional processor using burst buffers (indicated as BB) and a conventional processor-and-cache combination (indicated as Cache). Two versions of the algorithm were implemented, one with 32-bit pixels and one with 8-bit pixels. The same experimental measurements were taken for different image sizes, ranging from 8×8 to 128×128, and for different burst lengths.

As can be seen from the Figures, the BBC implementation showed a great performance advantage over the BB and the Cache implementations. The algorithm is relatively complex, and the overall performance of the system in both BB and Cache implementations is heavily compute-bound—the CPU simply cannot keep up because of the high complexity of the algorithm. Using embodiments of the invention, in which the computation is vastly more effective as it is carried out on the CHESS array (with its inherent parallelism), the performance is if anything IO-bound—even though is also efficient through effective use of burst buffers. Multimedia instructions (such as MIPS MDMX) could improve the performance of the CPU in the BB or the Cache implementations, as they can allow for some parallel execution of arithmetic instructions. Nonetheless, the performance enhancement resulting is unlikely to reach the performance levels obtained using a dedicated coprocessor in this arrangement.

MODIFICATIONS AND VARIATIONS

Figure 12:
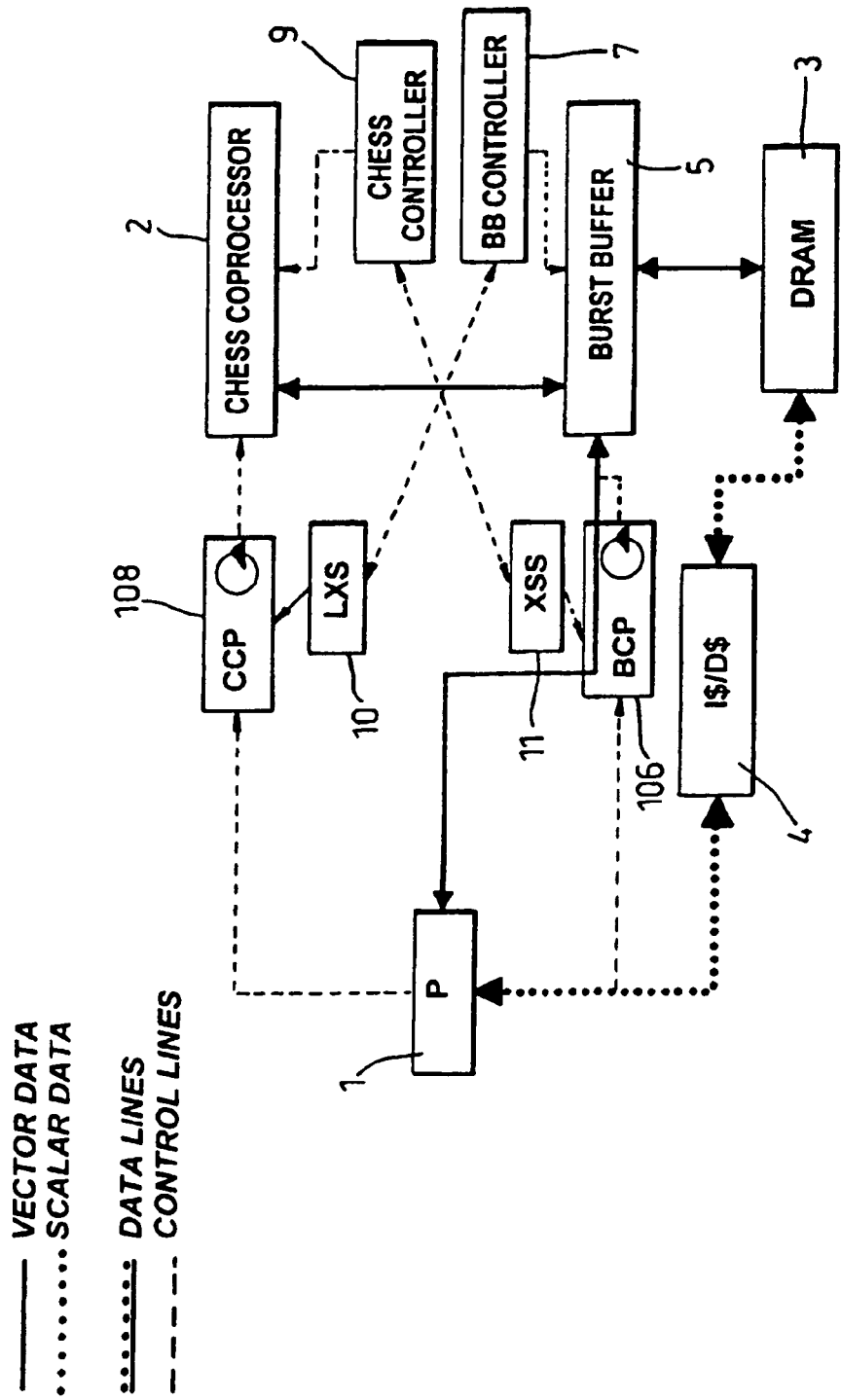
FIG. 12 shows two auxiliary processors usable as an alternative to the coprocessor instruction queue and the burst instruction queue in the architecture of FIG. 1.

The function of decoupling the processor 1 from the coprocessor 2 and the burst buffer memory 5 can be achieved by means other than the instruction queues 6,8. An effective alternative is to replace the two queues with two small processors (one for each queue) fully dedicated to issuing instructions to the burst buffers memory 5 and the coprocessor 2, as described in FIG. 12. The burst instruction queue is replaced (with reference to the FIG. 1 embodiment) by a burst command processor 106, and the coprocessor instruction queue is replaced by a coprocessor command processor 108. Since this would be the only task carried out by these two components, there would be no need for them to be decoupled from the coprocessor 2 and the burst buffers 7 respectively. Each of the command processors 106, 108 could operate by issuing a command to the coprocessor or burst buffers (as appropriate), and then do nothing until that command has completed its execution, then issue another command, and so on. This would complicate the design, but would free the main processor 1 from its remaining trivial task of issuing instructions into the queues. The only work to be carried out by processor 1 would then be the initial setting up of these two processors, which would be done just before the beginning of the computation. During the computation, the processor 1 would thus be completely decoupled from the execution of the coprocessor 2 and the burst buffers memory 5.

Two conventional, but smaller, microprocessors (or, alternatively, only one processor running two independent threads of control) could be used, each one of them running the relevant part of the appropriate code (loop nest). Alternatively, two general state machines could be synthesised whose external behaviour would reflect the execution of the relevant part of the code (that is, they would provide the same sequence of instructions). The hardware complexity and cost of such state machines would be significantly smaller than that of the equivalent dedicated processors. Such state machines would be programmed by the main processor 1 in a way similar to that described above. The main difference would be that the repetition of events would be encoded as well: this is necessary for processor 1 to be able to encode the behaviour of one algorithm in a few (if complex) instructions. In order to obtain the repetition of an event x times, the processor 1 would not have to insert x instructions in a queue, but would have to encode this repetition parameter in the instruction definition.

As indicated above, a particularly effective mechanism is for finite state machines (FSMs) to be used instead of queues to decouple the execution of the main processor 1 from the execution of coprocessor 2 and the burst buffers controller 7. This mechanism will now be discussed in further detail.

In the architecture illustrated in FIG. 1, instructions to drive the execution of different I/O streams can be mixed with instructions for execution of coprocessor 2. This is possible because the mutual relationships between system components is known at compile time, and therefore instructions to the different system components can be interleaved in the source code in the correct order.

Two state machines can be built to issue these instructions for execution in much the same way. One such state machine would control the behaviour of the coprocessor 2, issuing CC_xxx_xxx instructions as required, and the other would control the behaviour of burst buffers controller 7, issuing BB_xxx_xxx instructions as required.

Figure 13:
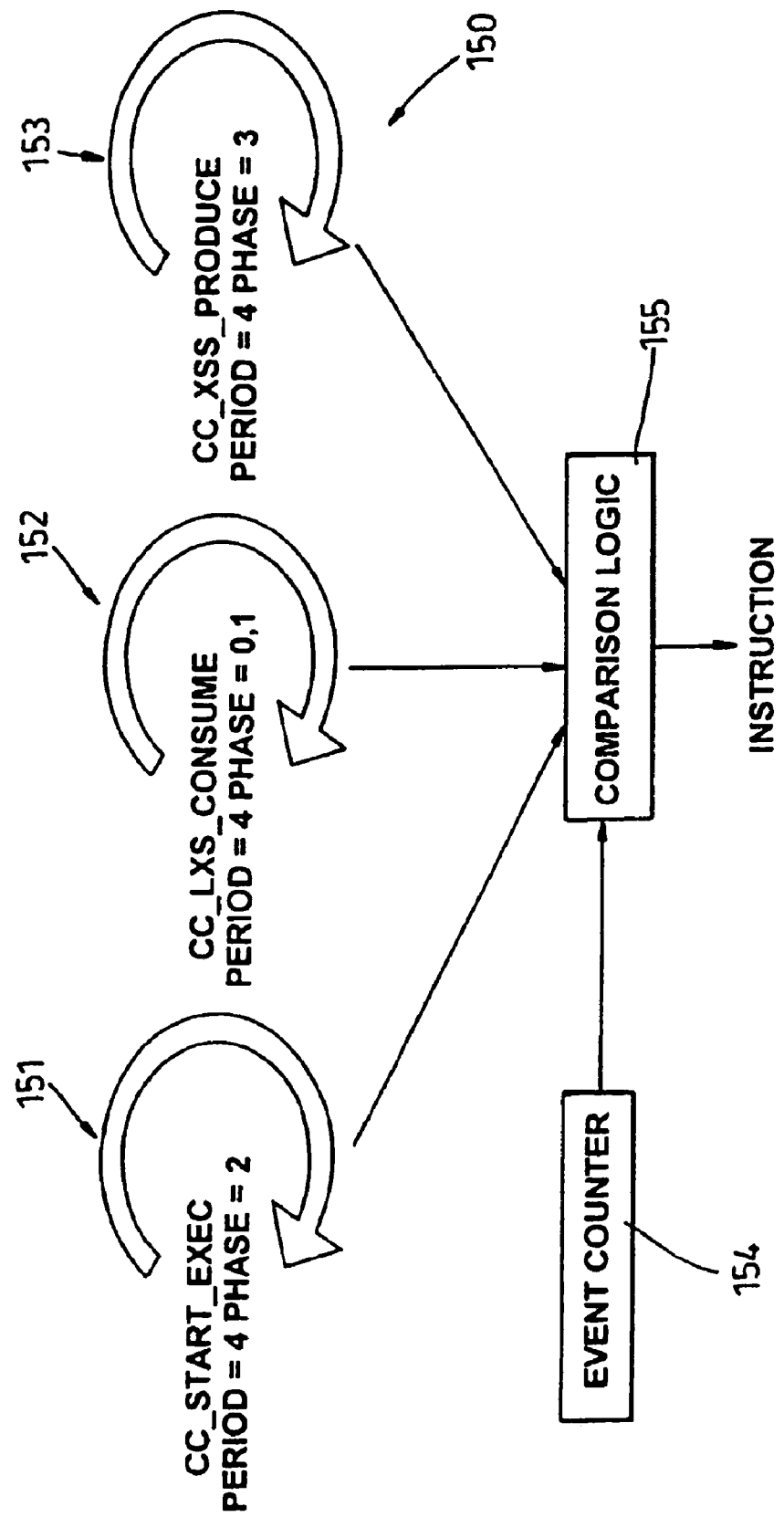
FIG. 13 shows implementation of a state machine as an alternative to the coprocessor instruction queue in the architecture of FIG. 1.

Such state machines could be implemented in a number of different ways. One alternative is indicated in FIG. 13. With reference to the vector addition example presented above, this state machine 150 (for the coprocessor 2, though the equivalent machine for the burst buffers controller 7 is directly analogous) implements a sequence of instructions built from the pattern:

CC_LX_DECREMENT,

CC_LX_DECREMENT,

CC_START_EXEC,

CC_XS_INCREMENT.

The main state machine 150 is effectively broken up into simpler state machines 151, 152, 153, each of which controls the execution of one kind of instruction. A period and a phase (note, this has no relationship to periods and phases which can be associated with I/O streams communicating between the coprocessor 2 and the burst buffers controller 7) is assigned to each of the simpler state machines. The hardware of state machine 150 will typically contain an array of such simpler state machines in a number sufficient to satisfy the requirements of intended applications.

An event counter 154 is defined. The role of the event counter 154 is to allow instructions (in this case, for coprocessor 2) to be sent out in sequence. Each time the event counter 154 is incremented, if there exists a value M such that $M*Period_i+Phase_i$=value of Event Counter, the state machine i (i.e. one of the simpler state machines 151, 152, 153) is chosen for execution through comparison logic 155, and its instruction is executed. It is the responsibility of the application software to ensure that no two distinct state machines can satisfy this equation. When the execution of that instruction is completed, the event counter 154 is incremented again. This sequence of events can be summarised as:

1: Increment event counter: EC++
2: Choose state machine i for execution if there exists an M such that $M*Period_i+Phase_i=EC$
3: If such a state machine i has been found, execute the instruction described by state machine i (this could include a suspension operation)
4: Go back to 1

A few extra parameters relevant to the execution of an instruction (addresses to read from/write to, length of execution for a CC_START_EXEC, etc.) will have to be encoded in the state machine 150. It should also be noted that more than one state machine can issue a given instruction, typically with different parameters.

This system works particularly well to generate periodic behaviour. However, if an event has to happen only once, it can readily be encoded in a simple state machine with infinite period and finite phase, the only consequence being that this simple state machine will be used only the once.

This approach can itself be varied. For example, to add flexibility to the mechanism, a possible option is to add 'start time' and 'end time' parameters to the simple state machines, in order to limit the execution of one or more simple state machines to a predetermined 'time window'.

The programming of these state machines would happen during the initialisation of the system, for example through the use of memory-mapped registers assigned by the processor 1. An alternative would be the loading of all the parameters necessary to program these state machines from a predefined region of main memory 3, perhaps through the use of a dedicated channel and a Direct Memory Access (DMA) mechanism.

The other alternative mechanism suggested, of using two dedicated microprocessors, would require no significant modification to the programming model for the architecture of FIG. 1: the same techniques used to program main processor 1 could be used, with an additional step of splitting commands intended for the coprocessor 2 from those intended for burst buffers controller 7. Although feasible, this arrangement may be disadvantageous with respect to the state machine approach. It would be necessary for these processors to be provided with access to main memory 3 or other DRAM, adding to the complexity of the system. The cost and complexity of the system would also be increased by adding (and underutilising, in that they are only present to perform very simple computations) two microprocessors in this way.

Various developments beyond the architecture of FIG. 1 and its alternatives can also be made without departing from the essential principles of the invention. Three such areas of development will be described below: pipelines, data dependent conditionals/unknown execution times, and non-affine accesses to memory.

Pipeline architectures have value where applications require more than one transformation to be carried out on their input data streams: for instance, a convolution may be followed immediately by a correlation. In order to accommodate this kind of arrangement, changes to both the architecture and the computational model will be required. Architecturally, successive buffered CHESS arrays could be provided, or a larger partitioned CHESS array, or a CHESS array reconfigured between computational stages. FIGS. 11A and 11B show different pipeline architectures effective to handle such applications and involving plural CHESS arrays. FIG. 11A shows an arrangement with a staggered CHESS/burst buffer pipeline instructed from a processor 143 and exchanging data with a main memory 144, where a CHESS array 141 receives data from a first set of burst buffers 142 and passes it to a second set of burst buffers 145, this second set of burst buffers 145 interacting with a further CHESS array 146 (potentially this pipeline could be continued with further sets of CHESS arrays and burst buffers). Synchronisation becomes more complex, and involves communication between adjacent CHESS arrays and between adjacent sets of burst buffers, but the same general principles can be followed to allow efficient use of burst buffers, and efficient synchronisation between CHESS arrays: semaphores could be used to guarantee the correctness of the computation carried out by successive stages of the pipeline.

FIG. 11B shows a different type of computational pipeline, with an SRAM cache 155 between two CHESS arrays 151, 156, with loads provided to a first set of burst buffers 152 and stores provided by a second set of burst buffers 157. The role of the processor 153 and of the main memory 154 is essentially unchanged from other embodiments. Synchronisation may be less difficult in this arrangement, although the arrangement may also exploit parallelism less effectively.

One constraint on efficient use of the coprocessor in an architecture as described above is that the execution time of the coprocessor implementation should be known (to allow efficient scheduling). This is achievable for many media-processing loops. However, if execution times are unknown at compile time, then the scheduling requirements in the toolchain need to be relaxed, and appropriate allowances need to be made in the synchronisation and communication protocols between the processor, the coprocessor and the burst buffers. The coprocessor controller also will need specific configuration for this circumstance.

Another extension is to allow non-affine references to burst buffers memory. In the burst buffers model used above, all access is of the type AI+F, where A is a constant matrix, I is the iteration vector and F is a constant vector. Use of this limited access model allows the coprocessor controller and the processor to know in advance what data will be needed at any given moment in time, allowing efficient creation of logical streams. The significance of this to the architecture as a whole is such that it is unclear how non-affine access could be provided in a completely arbitrary way (the synchronisation mechanisms would appear to break down), but it would be possible to use non-affine array accesses to reference lookup tables. This could be done by loading lookup tables into burst buffers, and then allow the coprocessor to generate a burst buffer address relative to the start of the lookup table for subsequent access. It would be necessary to ensure that such addresses could be generated sufficiently far in advance to the time that they will be used (possibly this could be achieved by a refinement to the synchronisation mechanism) and to modify the logical stream mechanism to support this type of recursive reference.

Many variations and extensions to the architecture of FIG. 1 can thus be carried out without deviating from the invention as claimed.

The invention claimed is:

1. A computer system, comprising:
   a first processor;
   a second processor for use as a coprocessor to the first processor;
   a coprocessor controller;
   a memory;
   a buffer memory from which the second processor loads data and to which the second processor stores data, wherein the buffer memory is adapted to load data from the memory and store data to the memory;
   a first decoupling element; and
   a second decoupling element,
   wherein computations are passed to the second processor from the first processor through the first decoupling element, such that the second processor executes computations passed from the first processor through the first decoupling element, and wherein the second processor receives data from and writes data to the memory, and wherein the coprocessor controller controls the activity of the second processor to ensure execution of the second processor is correctly ordered with respect to loads from memory, whereby the execution of computations by the second processor is decoupled from the operation of the first processor such that the second processor executes computations passed from the first processor through the first decoupling element while the first processor is providing further instructions to the first decoupling element, and further wherein memory instructions relating to movement of data between the buffer memory and the memory are passed to the buffer memory from the first processor through the second decoupling element, such that the buffer memory consumes instructions derived from the first processor through the second decoupling element, whereby the processing of memory instructions by the buffer memory is decoupled from the operation of the first processor.

2. A computer system as claimed in claim 1, wherein the first decoupling element is a coprocessor instruction queue, wherein computations are added to the coprocessor instruction queue by the first processor and consumed from the coprocessor instruction queue by the coprocessor.

3. A computer system as claimed in claim 1, wherein the first decoupling element is a state machine, wherein information to provide computations to the second processor is provided to the state machine by the first processor, and computations are provided in an ordered sequence to the second processor by the state machine.

4. A computer system as claimed in claim 1, wherein the first decoupling element is a third processor, wherein information to provide computations to the second processor is provided to the third processor by the first processor, and computations are provided in an ordered sequence to the second processor by the third processor.

5. A computer system as claimed in claim 1, wherein the second processor is configurable.

6. A computer system as claimed in claim 5, wherein the second processor is adapted to be configured in accordance with a configuration downloaded from the memory.

7. A computer system as claimed in claim 1, wherein the first processor is able to switch tasks during execution of computations by the second processor.

8. A computer system as claimed in claim 1, wherein the memory is dynamic random access memory, and the buffer memory is adapted to load data from, or store data to, the buffer memory in bursts.

9. A computer system as claimed in claim 1, wherein the second decoupling element is a buffer memory instruction queue, wherein memory instructions are added to the buffer memory instruction queue by the first processor and consumed from the buffer memory instruction queue by the buffer memory.

10. A computer system as claimed in claim 9, wherein the second decoupling element is a state machine, wherein information to provide memory instructions to the buffer memory is provided to the state machine by the first processor, and memory instructions are provided in an ordered sequence to the buffer memory by the state machine.

11. A computer system as claimed in claim 1, wherein the second decoupling element is a fourth processor, wherein information to provide memory instructions to the buffer memory is provided to the fourth processor by the first processor, and memory instructions are provided in an ordered sequence to the buffer memory by the fourth processor.

12. A computer system as claimed in claim 1, further comprising a synchronisation mechanism to synchronise transfer of data between the buffer memory and the memory with execution of computations by the second processor.

13. A computer system as claimed in claim 12, wherein the synchronisation mechanism is adapted to block execution of computations by the second processor on data which has not yet been loaded to the buffer memory from the memory, and is adapted to block execution of memory instructions for storage of data from the buffer memory to the memory where relevant computations have not yet been executed by the second processor.

14. A computer system as claimed in claim 13, adapted such that when execution of computations or memory instructions is blocked by the synchronisation mechanism, other computations or memory instructions which are not blocked by the synchronisation mechanism may be executed.

15. A computer system as claimed in claim 1, wherein the first processor is the central processing unit of a computer device.

* * * * *